June 2, 1970 — M. J. E. GOLAY — 3,515,979

MAGNETIC FIELD CONTROL APPARATUS

Filed Nov. 4, 1957 — 7 Sheets-Sheet 1

INVENTOR.
MARCEL J.E. GOLAY
BY
ATTORNEY

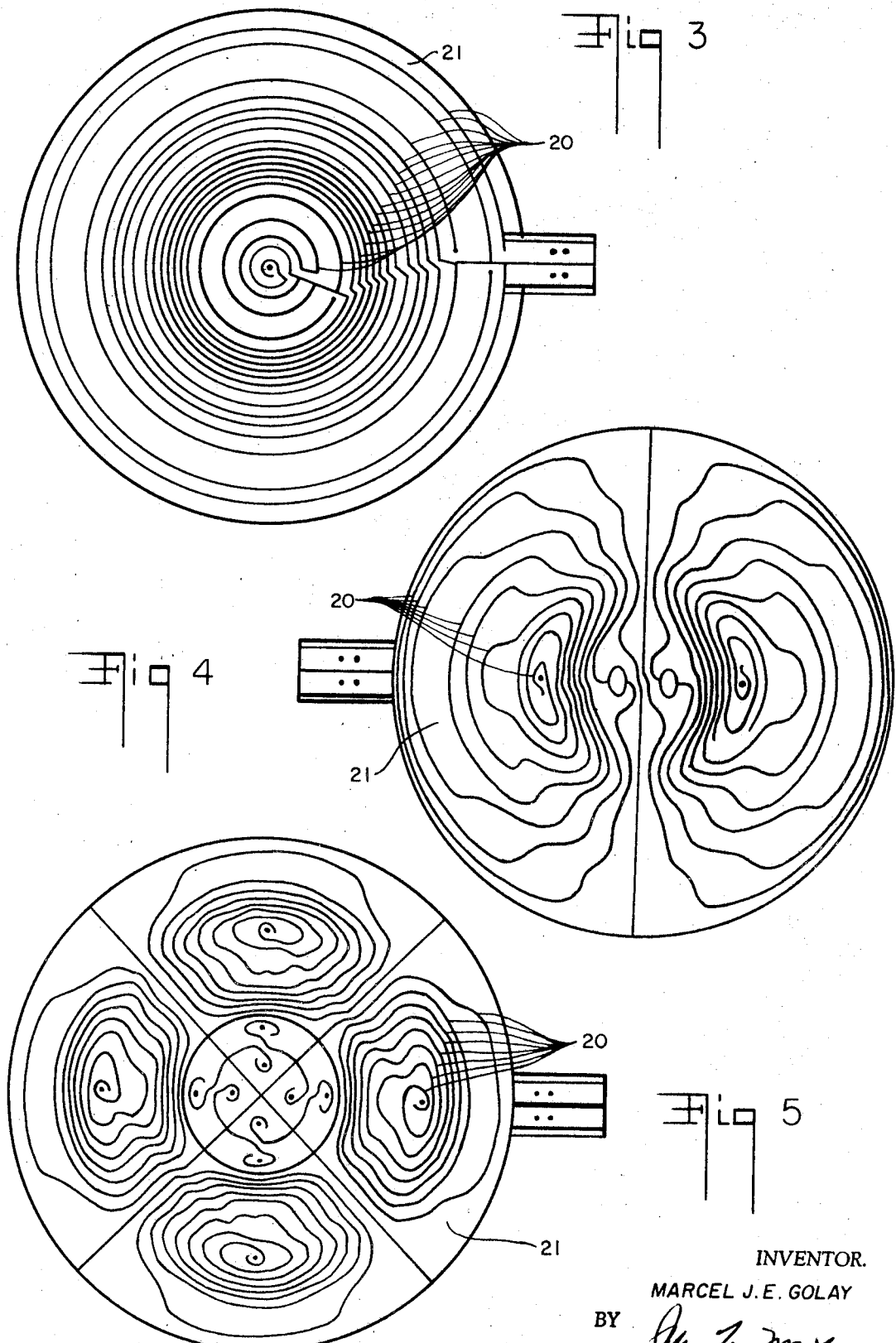

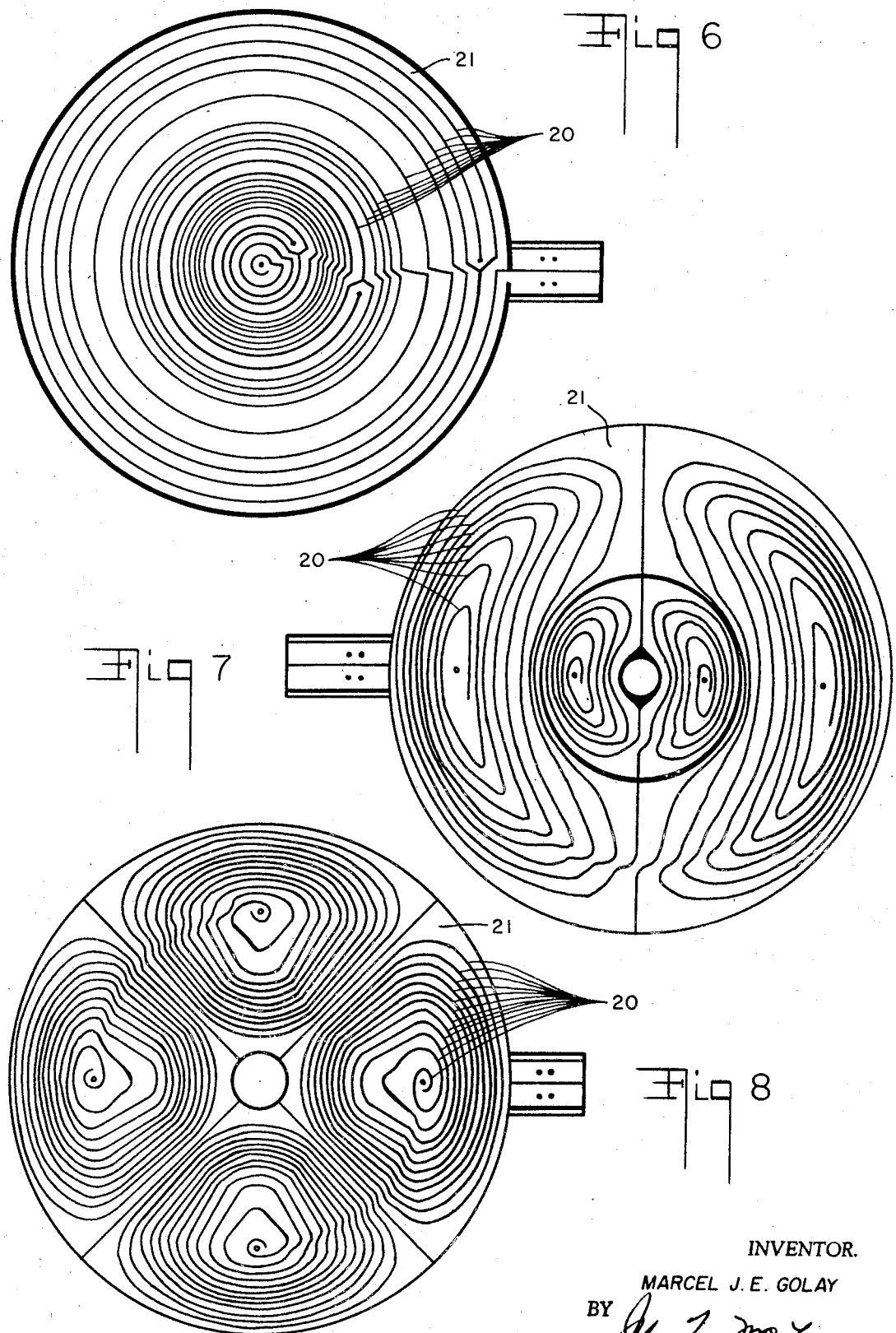

June 2, 1970  M. J. E. GOLAY  3,515,979
MAGNETIC FIELD CONTROL APPARATUS
Filed Nov. 4, 1957  7 Sheets-Sheet 6

INVENTOR.
MARCEL J. E. GOLAY
BY
ATTORNEY

June 2, 1970  M. J. E. GOLAY  3,515,979

MAGNETIC FIELD CONTROL APPARATUS

Filed Nov. 4, 1957  7 Sheets-Sheet 7

INVENTOR.
MARCEL J. E. GOLAY

BY
ATTORNEY

United States Patent Office 3,515,979
Patented June 2, 1970

3,515,979
MAGNETIC FIELD CONTROL APPARATUS
Marcel J. E. Golay, Rumson, N.J., assignor to The Perkin-Elmer Corporation, Norwalk, Conn., a corporation of New York
Filed Nov. 4, 1957, Ser. No. 694,427
Int. Cl. G01n 27/00; H01f 5/00, 27/28
U.S. Cl. 324—.5                                         18 Claims This invention is concerned with an apparatus and a method for producing, modifying or changing a magnetic field. The invention contemplates the generation of a number of auxiliary magnetic fields which may be employed to modify or change a main magnetic field to conform to a desired configuration. The main magnetic field may be the earth's magnetic field or it may be the magnetic field which exists for instance between the poles of an electromagnet or of a permanent magnet.

The invention conceives of utilizing a plurality of discrete electroconductors to operate upon a magnetic field. When connected to a source of electrical energy, each of the plurality of electroconductors provides a current path and the several current paths are so arranged and disposed that the adjustments of the currents in the several electroconductors are operationally orthogonal. These adjustments are operationally orthogonal in the sense that the setting of each to produce the optimum conformity of the field to a desired configuration is substantially or completely independent of the settings of any of the others.

The operational orthogonality of the present invention affords an outstanding advantage over prior art systems utilizing auxiliary magnetic fields to conform a main magnetic field to a desired configuration. The present invention provides facility, directness, and a degree of perfection in reaching optimum adjustment which cannot be achieved by prior art arrangements.

In the operation of the present invention, as the current in each electroconductor is adjusted, a measure of departure of the field from the desired configuration is observed. This measure comes closest to optimum for one setting of each of the plurality of current adjustments. If operational orthogonality is complete, only one setting of each adjustment is required. If operational orthogonality is substantial, but not complete, then after an initial setting of each adjustment to optimize the measure of deviation of the field from the desired configuration, a second setting requires only a relatively small change in adjustment to get a better optimum.

Since on each successive return to one of the adjustments the change of setting required is much smaller and the influence of any one setting on the optimum values of all the others is already small because of their substantial operational orthogonality, the orderly procedure of successive resetting of each adjustment leads to a rapid convergence of each setting to its optimum value, even for a large number of adjustments.

The procedure of the present invention is in contrast to that of finding the optimum setting of a large number of adjustments which are not substantially operationally orthogonal because the setting of each has a relatively large effect upon the optimum setting of some or all of the others. Without operational orthogonality, the setting of any one adjustment to improve the measure of deviation of the field from optimum configuration vitiates the previous settings of others. In prior art devices, the iterative setting for all can be found only by trying combinations of selected settings of all the adjustments. For a large number of adjustments, the number of trials required becomes so large as to be a practical impossibility.

In this invention, the operational orthogonality of adjustments of the field is achieved by so arranging and disposing the current path of each of the plurality of electroconductors that the magnetic potential of the field produced by a flow of current in each electroconductor is substantially mathematically orthogonal with the magnetic potential of the field produced by flow of current in any other electroconductor of the set, the condition of mathematical orthogonality applying at least over the volume of interest in which the departure of the total field from optimum configuration is measured.

It is preferable in executing the concept of the present invention that a large set of orthogonal functions be chosen so that any special configuration of a magnetic field or any lack of uniformity or nonhomogeneity of a magnetic field may be expressed in terms of the complete set of orthogonal functions. In accordance with the teaching of the present invention, coils may be designed which will produce a plurality of magnetic fields having potentials which are mathematically orthogonal, and if separate control means are provided to afford the individual adjustment of current flow through each of the plurality of coils employed in the present invention, the amount of current flow and hence the intensity of the incremental field produced by each of the coils may be individually adjusted without materially affecting any of the other incremental fields.

The noninterferring adjustment of each incremental magnetic field of the present invention is an essential feature which distinguishes it from prior art arrangements employing schemes for supplementing a main magnetic field with additional auxiliary magnetic fields. These prior art coils are such that the adjustment of the current flow through one such coil will affect one or more of the current adjustments in other auxiliary coils. It has also been found in practice that, upon realization of the orthogonality as taught by the present invention, the mutual inductance between the coils which are independently adjustable is substantially negligible when compared to the self inductance of said coils.

A primary object of the present invention is the correction of a magnetic field to create a desired configuration.

An equally important object of the present invention is to significantly improve the uniformity of a magnetic field.

A related object of the present invention is the generation of magnetic fields of extremely high uniformity of intensity over relatively large volumes of space.

Another object of the present invention is the probing and detection of the departure of a magnetic field from uniformity and the determination of the corrective steps required to render such a field significantly more uniform.

Another object of the present invention is the generation of a plurality of incremental magnetic fields which are proximate to each other and the space upon which it is desired to operate, but which may nonetheless be individually and selectively controlled without materially affecting any other of the plurality of such magnetic fields.

A better understanding of the present invention may be had by reference to the drawings which illustrate several embodiments of the present invention and to the accompanying explanation of how the present invention may be practiced and how the configuration of several typical embodiments of the present invention may be derived.

FIGS. 3–10 illustrate the configurations of conductive material remaining on a laminate material defining the current paths of another embodiment of the present invention.

FIG. 14 schematically illustrates a nuclear magnetic resonance magnetic field measuring apparatus embodying the present invention.

FIG. 15 is a schematic illustration of a nuclear magnetic resonance magnetic field control system embodying the present invention.

Figure 16:
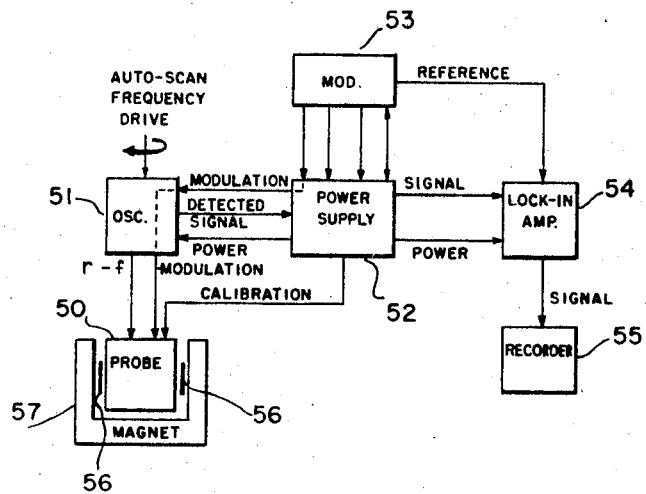

FIG. 16 is a schematic representation of a nuclear magnetic resonance spectrometer apparatus operating upon the absorption principle and embodying the present invention.

Figure 17:
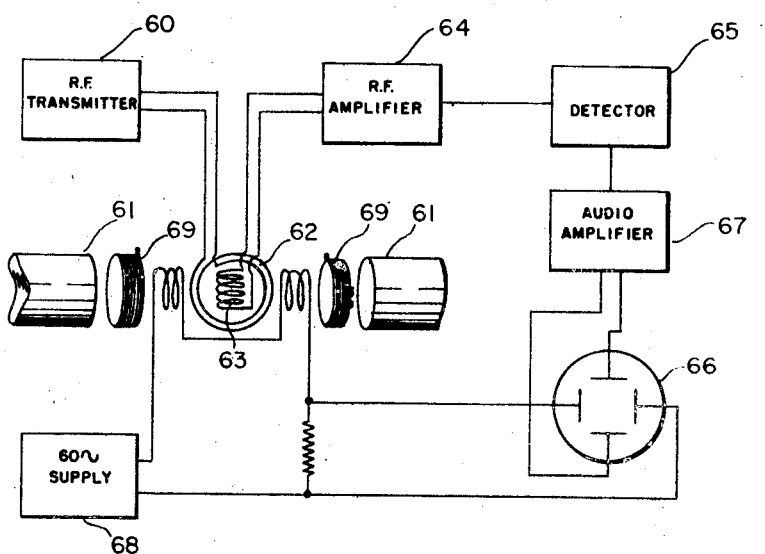

FIG. 17 is a schematic representation of a nuclear induction apparatus embodying the present invention.

For purposes of explanation, the particular embodiment of the present invention which affords the correction of the lack of homogeneity of a magnetic field will be used, though the concept and scope of the present invention is not limited to the correction of a lack of magnetic field homogeneity. As has been previously stated, the present invention may be utilized in order to conform any magnetic field to a desired configuration whether or not that configuration be precise uniformity and homogeneity.

The following delineation discloses the steps which may be used in designing the incremental coils employed in a typical embodiment of the present invention used to correct the lack of homogeneity in a magnetic field.

A magnetic field always satisfies the condition $$\text{div } B = 0 \tag{1}$$

When the permeability is uniform in the region of interest, this condition may be stated as $$\text{div } H = 0 \tag{2}$$

Furthermore, when there are no electrical currents in the region of interest, the additional three relations may be expressed vectorially as $$\text{curl } H = 0 \tag{3}$$

In that case, the field can be derived from a potential $$H \text{ grad } \mu = 0 \tag{4}$$

where $\mu$ also satisfies the condition $$\nabla^2 \mu = \text{div grad } \mu = \frac{\partial^2 \mu}{\partial x^2} + \frac{\partial^2 \mu}{\partial y^2} + \frac{\partial^2 \mu}{\partial z^2} = 0 \tag{5}$$

If $\mu$ is expressed as a polynomial of the cartesian coordinates $$\mu = \Sigma \frac{j! k! l!}{(j+k+l)!} \alpha_{jkl} \times j_y k_z l \tag{6}$$

the terms of degree $n = j+k+l$ will number $$\frac{(n+1)(n+2)}{2}$$

but will be subject to $$\frac{n(n-1)}{2}$$

restraints by virtue of (5), so that the total number of independent instrumental parameters required to adjust the terms of $n$th degree to zero will number the difference of these two expressions, i.e., $2n+1$.

Since this number is also equal to the number of independent orthogonal spherical harmonics of degree $n$, the spherical harmonics of degree $n$ are not only orthogonal, but form a complete set of functions in which any inhomogeneity of degree $n$ can be expressed.

With these premises, it may now be demonstrated how it is possible to place on a nonmagnetic, nonconductive sphere several independent conductor windings in which electrical currents will produce the various magnetic fields which can be expressed as spherical harmonics, and will thus serve to cancel, term by term, the inhomogeneity of a magnetic field, which is also expressible in spherical harmonics.

The sphere on which these windings will be placed will be assumed for purposes of explanation to be in infinite space of uniform permeability. Actually, such a sphere may be placed halfway between the pole pieces of a large magnet, and the effect of these pole pieces will be as if an infinite array of like sphere with like currents were strung out on a straight line, with a separation equal to that of the pole pieces. Fortunately, the effect of these neighboring virtual spheres will be very small, decreasing with the degree of the harmonics involved, and the desired effect of having several independently adjustable currents to correct magnetic field inhomogeneity will be substantially maintained.

Likewise, the effect of small magnet inhomogeneities will be largely expressible in terms of harmonics of low degrees, and the content of harmonics of higher degrees, in the center of the sphere where a high homogeneity is desired, will decrease very rapidly with increasing degrees.

Indeed, it will be seen that higher degree harmonics will be introduced by the windings designed to cancel lower degrees. For instance, harmonics of the 4th, 6th, etc., orders will be introduced by the windings designed to produce or cancel 2nd degree harmonics, because these windings constitute only an approximation of the continuously distributed currents which would be required to produce 2nd degree harmonics only, and the possibility must be considered that 4th degree windings, for instance, may be required for the essential purpose of cancelling the harmonics introduced by the currents in the 2nd degree windings.

The manner in which the windings are determined from the mathematical expressions given for the harmonics themselves may now be examined.

The solution of Equation 5 represent the potential of the magnetic field created by certain surface currents on the sphere, and the boundary conditions at the sphere will demand that $\partial u/\partial r$ be continuous across the sphere, since div B = div uH = u div H = 0 every where in a field of uniform permeability. It can be immediately verified that the potentials inside and outside the sphere, $u_i$ and $u_e$ will be related by $$\mu_i = r^n \theta_n^m(v) \phi_m(\varphi)$$

$$\mu_e = -\frac{n}{n+1} r^{-n-1} \theta_n^m(v) \phi^m(\varphi)$$

and the relation $i = \text{curl } H$ indicates that the current components along the meridian (longitude) circles of the sphere passing through the $z$-axis, and along the parallel (latitude) circles, $i_v$ and $i_\varphi$, will be given by the relations $$i_\delta = \frac{1}{\sin \delta} \frac{\partial u_i}{\partial \phi} = 3_n^m(v) \frac{1}{\sin v} \frac{\partial}{\partial \varphi} \phi_m(\varphi) \tag{7}$$

$$i_\delta = -\frac{\partial u_i}{\partial \delta} = -\phi_m(\varphi) \frac{\partial}{\partial v} 3_n^m(v) \tag{8}$$

where a dimensional constant has been dropped since we are interested in the morphology only of these current distributions.

For the case $$\mu_i = r \cos \delta \tag{9}$$

we obtain $$i_\delta = 0$$
$$i_\varphi = \sin \delta \tag{10}$$

which indicates that currents along parallels and proportional to the cosine of the latitude $$\left( v - \frac{\pi}{2} \right)$$

produce a uniform field parallel to the $z$ or polar axis inside the sphere. If this current distribution is simulated by a current passing through a single equatorial winding, the magnetic potential due to this current will be proportional to the solid angle under which this winding is seen, and along the z axis it will be represented by the expression:

$$\mu = \frac{z}{\sqrt{1+\left(\frac{z}{r_o}\right)^2}}$$

$$= z\left[1 - \frac{1}{2}\left(\frac{z}{r_o}\right)^2 + \frac{1.3}{2.4}\left(\frac{z}{r_o}\right)^4 - \frac{1.3.5}{2.4.6}\left(\frac{z}{r_o}\right)^6 + \cdots\right] \quad (11)$$

where $r_o$ designates the sphere radius. This expression illustrates two important conclusions, namely, that the 1st harmonic current when concentrated on the equator produces higher harmonics of alternate degrees, and the order of magnitude of these harmonics at a distance $z$ from the center of the sphere decreases with the alternate even (second, fourth, etc.,) power of $(z/r_o)$.

Actually, the harmonics of first degree are not of interest in the problem of homogenizing a magnetic field, and the example above was examined for the sake of arriving at the two conclusions just stated.

We pass now to the second degree harmonics. The second degree zonal harmonic is given by $$\mu = 3\cos^2 v - 1 \quad (12)$$

The current density required to produce this harmonic is given by $$i_\phi = 3 \sin 2\delta; \ i_\delta = 0 \quad (13)$$

The current density along parallels has one sign in the upper hemisphere, and the opposite sign in the lower hemisphere, and reaches a maximum at $v=45°$ and $v=135°$, respectively. A first possible approximation of this current distribution could be two circular windings along the two parallels characterized by the angles just given, and traversed by two equal currents in opposite directions.

Another and more convenient method for determining the approximate position of the windings, which may be followed, consists in placing them along the lines given by $\mu=0$. This would give the angles $v=55°$ and $v=125°$.

When no definite symmetry consideration exists for determining $v$, a third method is utilized for this purpose, which consists in seeking a condition under which a lower or higher harmonic can be caused to vanish. In this case, symmetry considerations indicate that the third order harmonic produced by these currents is zonal, and that its value along the z axis will vanish where $$\frac{\partial^3 \mu}{\partial z^3} = 0 \ \text{where} \ \mu = \frac{z}{\sqrt{1+\frac{z^2}{r_o^2}}} \quad (14)$$

Figure 1A:
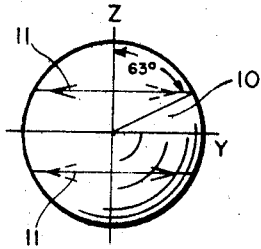
FIGS. 1a–1e and 2a–2g illustrate the disposition of conductive windings on a nonconductive sphere in one embodiment of the present invention.
Figure 1B:
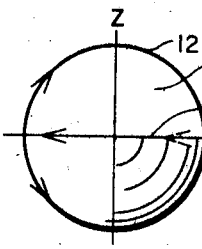
Figure 1C:
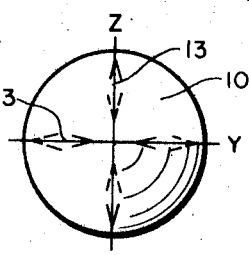
Figure 1D:
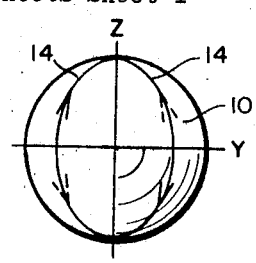
Figure 1E:
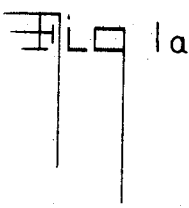

This condition is realized when $z=½r_o$ which gives $v=63°$ and $v=117°$ for the respective positions of the two windings. This is the solution adopted and illustrated by FIG. 1a.

For all other second order harmonics, the windings are determined unabiguously by the positions on the sphere where these harmonics vanish. For instance, the tesseral harmonic $$\mu = \sin 2\delta \sin \phi \quad (15)$$

vanishes for the two orthogonal great circles $\delta=90°$ and $\varphi=0°$ or $180°$ and the direction of the current along these circles can be determined by the convention that a right-handed screw motion in the direction of the current goes into the sphere where $\mu<0$ (for instance), and out of where $\mu<0$.

For the case of second degree harmonics, the tesseral and sectorial harmonics are similar, and the four windings 12, 13, 14, and 15 for these cases are illustrated in FIGS. 1b to 1e, respectively. In the embodiment illustrated by these figures, a non-coductive, nonmetallic sphere 10 supports a plurality of windings disposed and arranged in accordance with the calculations previously explained. Each of the figures illustrates one set of related windings on the sphere 10 and, in the interest of clarity, no attempt is made to illustrate all the windings on the sphere 10 as they would be used in practice. The windings are adapted to be connected to a source of electrical energy and arranged for separate control of current flow through each winding.

In FIGS. 1a to 1g, the heavy lines denote windings; the full and dotted arrowheads denote direction of current flow through the windings in front and rear of sphere 10, respectively.

The zonal third degree harmonic is $$\mu = 5\cos^3 v - 3\cos v \quad (16)$$

and vanishes for $v=90°$ and $v=90°\pm51°$.

Figure 2A:
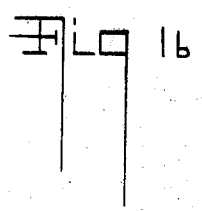

However, it can be easily verified that an equatorial winding 11a (FIG. 2a) with a right-handed current and two windings 16 at $v=90°\pm51°$ with left-handed current would produce a first degree component in the center. On the other hand, this component vanishes when $v=90°\pm45°$, which are the values adopted for the windings 16 as illustrated in FIG. 2a. This zonal harmonic is particularly important, because it expresses the "barrelling" distortion of the field caused by the finite extension of the pole pieces. For this reason, it is believed advisable to use a larger size wire for the corresponding winding.

The first 3rd degree tesseral harmonic for $m=1$ is $$\mu = \sin v(5\cos^2 v - 1)\cos\varphi \quad (17)$$

and vanishes along the great circle $\varphi=90°$ (and $270°$) and along the two parallels for which $v=90°\pm27°$.

Windings at these positions would produce a first order harmonic which can be caused to vanish by the proper selection of $v$.

The magnetic field corresponding to this harmonic can be calculated with convenience by means of the expression giving the contribution to the magnetic field at a point P from a current unity in an elementary path $ds$ $$\overrightarrow{dH} = \frac{\overrightarrow{ds} \times \overrightarrow{dsP}}{1dsP1^3} \quad (18)$$

where $$\overrightarrow{dsP}$$

designates the geometric vector joining $ds$ and P.

The application of this expression indicates that the contribution of the windings on the two parallels to a field along the $x$-axis is proportional to $\sin 2v$ while the contribution of the windings on the meridian $\varphi=0$ (and $180°$) is proportional to $$\frac{\pi}{2} - 2v$$

Figure 2B:
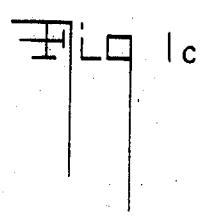
Figure 2C:
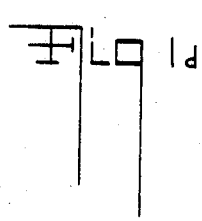

Setting the sum of these contributions to zero yields $v=66°$, which is the value utilized in the windings 17 illustrated in FIGS. 2b and 2c.

Figure 2D:
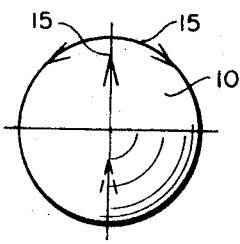
Figure 2E:
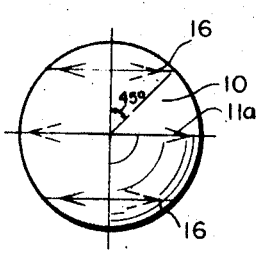

The first 3rd degree tesseral harmonic for which $m=2$ is $$\mu = \sin^2 v \cos v \cos 2\varphi \quad (19)$$

and vanishes along the three mutually orthogonal great circles for which $v=90°$, $\varphi=45°$ (and $225°$), and $\varphi=135°$ (and $315°$). This determines, unambiguously, the position of the windings 18 illustrated by FIGS. 2d and 2e.

The first 3rd degree sectorial harmonic is given by $$\mu = \sin^3 \delta \cos 3\varphi \quad (20)$$

and vanishes along the three great circles for which $\varphi=30°$ (and $210°$), $\varphi=90°$ (and $210°$) and $\varphi=150°$ (and $330°$).

Figure 2F:
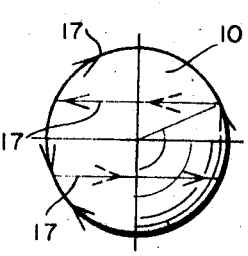
Figure 2G:
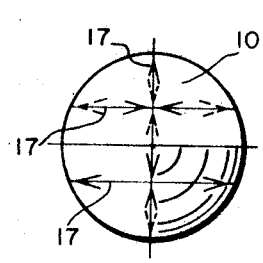

This unambiguously determines the position of the windings 19 illustrated by FIG. 2f, and by FIG. 2g for the second 3rd degree sectional harmonic.

Windings designed to cancel harmonics of higher order can be designed, and the pattern established above may be followed with ease for the determination of the seven windings required to cancel 4th degree harmonics, for instance. In all cases, the determination of the windings of any degree should be such that no harmonic of lower degree is generated by these windings, and it is only after this requirement has been met that any remaining degree of freedom in the determination of the $v$'s of the windings along parallels can be utilized to prevent the generation of harmonics of higher degree. With the fulfillment of this condition, it is believed that a sufficient degree of orthogonality will be obtained, so that a minimum amount of trial and error will be required to adjust the uniformity of the field. If, however, it should be desirable in a particular case to use more complex windings so that no harmonic of the alternate higher degree is present, doubling the number of turns of each winding should probably provide enough additional degrees of freedom, so that the latter-stated condition also can be satisfied.

It is to be noted that the problem treated so far was that of uniformizing the vectorial magnetic field. Actually, what is most frequently required is uniformity of the magnetic field intensity. It can be shown theoretically that a magnetic field of uniform intensity must be uniform in direction also, but in practice there can be slight departures from unidirectionality of the field which are of a first order of smallness, while the departures from uniformity of intensity are of a second order of smallness. An example of this is given by a magnetic field in the $z$ direction which is uniform, except for the presence of a small perturbing field corresponding to a sectorial harmonic (i.e., $\mu = xy$).

It will be noted that the embodiment employing spherical windings was discrete in the sense that each winding consisted of a few simple loops of wire. By contrast, the embodiment using flat coils which may be placed against the pole faces of a magnet is continuous in the sense that each winding will be continuously distributed in a plane. This continuous distribution makes it possible to design windings which produce nearly exclusively one specific harmonic, while harmonics of higher degree are eliminated.

The printed circuit technique lends itself readily to the practical embodiment of this latter version of the present invention. Laminated aggregates consisting of two copper foils separated by an insulating sheet may be utilized. The first copper foil is used to form the actual current path, while the second copper foil is utilized to produce the lead or leads required to carry electrical current to and from the single coil or multiple coils etched in the first foil.

It will be assumed that the flat coil embodiment of the present invention is to be used to homogenize a portion of the magnetic field in an air gap between the poles of a magnet.

Since the center of the gap in which magnetic homogeneity is desired is not accessible for the placement of windings, the initial step in the solution is to determine mathematical harmonic configurations satisfying the relation ship.

$$\Delta^2 \mu = 0 \qquad (21)$$

throughout the air gap, and having no real poles within this gap. This is accomplished by first selecting as coordinates the axis of symmetry of the magnet pole pieces which in most cases will be round, along with the Z coordinate is measured, while the other two coordinates are the distance to this axis, $r$, and the angle $\varphi$ subtended by the perpendicular from any point to $z-$ axis, and a reference direction perpendicular to that axis. The general condition written above for $\mu$ is expressed in the system of cylindrical coordinates just described by the relation.

$$\frac{\partial^2 \mu}{\partial r^2} + \frac{1}{r}\frac{\partial \mu}{\partial r} + \frac{\partial^2 \mu}{\partial z^2} + \frac{1}{r^2}\frac{\partial^2 \mu}{\partial \phi^2} = 0 \qquad (22)$$

It can be easily verified that the condition written above is satisfied by functions of the general form $$\mu = J_m\left(\frac{r}{r_o}\right) \times \left(\sin h \frac{z}{r_o} \text{ or } \cos h \frac{z}{r_o}\right) \times (\sin m\phi \text{ or } \cos m\phi) \qquad (23)$$

where $r_o$ designates a normalizing length or scale factor, and where $$J_m\left(\frac{r}{r_o}\right)$$

designates the Bessel function of $m$th order, and satisfies the condition stated earlier of having no real poles for any value of $r$.

The parameter $m$ is the order of harmonic dealt with, and has the same meaning given it in connection with the description of the spherical windings.

The separation of the expression just written for $\mu$ into spherical harmonics of distinct order can be effected by multiplying, term by term, the series expansions of $J_n(r/r_o)$ and $$\sin h \frac{z}{r_o} \text{ or } \cos h \frac{z}{r_o}$$

and grouping the terms of equal powers of $r_o$. Carrying out this operation for $$J_o\left(\frac{r}{r_o}\right) \cos h \frac{z}{r_o}$$

yields $$J_o\left(\frac{r}{r_o}\right) \cos h \frac{z}{r_o} = \left[1 - \frac{1}{2^2}\left(\frac{r}{r_o}\right)^2 + \frac{1}{2^2 4^2}\left(\frac{r}{r_o}\right)^4 - \frac{1}{2^2 4^2 6^2}\left(\frac{r}{r_o}\right)_o^6 + \cdots \right] \times \left[1 + \frac{1}{2!}\left(\frac{z}{r_o}\right)^2 + \frac{1}{4!}\left(\frac{z}{r_o}\right)^4 + \frac{1}{6!}\left(\frac{z}{r_o}\right)^6 + \right] = 1$$

$$+ \frac{1}{4r_o^2}(2z^2 - r^2) + \frac{1}{192}r_o^4(8z^4 - 24z^2r^2 + 3r^4)$$

$$+ \frac{1}{11520 r_o^6}(16z^6 - 120z^4r^2 + 90z^2r^4 - 5r^6) + \cdots \qquad (24)$$

The expressions within parenthesis in the last member will be recognized as the zonal harmonics of even degree. Likewise, the similar expansion $$J_o\left(\frac{r}{r_o}\right) \sin h \frac{z}{r_o} = \left[1 \frac{1}{2^2}\left(\frac{r}{r_o}\right)^2 + \frac{1}{2^2 4^2}\left(\frac{r}{r_o}\right)^4 - \frac{1}{2^2 4^2 6^2}\left(\frac{r}{r_o}\right) + \right] \times \left[\frac{z}{r_o} - \frac{1}{3!}\left(\frac{z}{r_o}\right)^3 + \frac{1}{5!}\left(\frac{z}{r_o}\right)^5 - \right] = z$$

$$+ \frac{1}{12}(2z^3 - 3zr^2) + \frac{1}{960}r_o^5(8z^5 - 40z^3r^2 + 15zr^4) + \cdots, \qquad (25)$$

yields the zonal harmonics of odd degree.

The two following expansions $$J_1\left(\frac{r}{r_o}\right) \cos h \frac{z}{r_o} = \left[\frac{1}{2}\frac{r}{r_o} - \frac{1}{2^2 4}\left(\frac{r}{r_o}\right)^3 + \frac{1}{2^2 4^2 6}\left(\frac{r}{r_o}\right)^5 \cdots \right]$$

$$\times \left[1 + \frac{1}{2!}\left(\frac{z}{r_o}\right)^2 + \frac{1}{4!}\left(\frac{z}{r_o}\right)^4 + \cdots \right] = \frac{1}{2}\frac{r}{r_o}$$

$$+ \frac{1}{16 r_o^3}(4z^2r - r^3) + \frac{1}{384 r_o^5}(8z^4r - 12 z^2 r^3 + r^5) + \cdots \qquad (26)$$

and $$J_1\left(\frac{r}{r_o}\right)\sin h\frac{z}{r_o}=\left[\frac{1}{2}\frac{r}{r_o}-\frac{1}{2^2 4}\left(\frac{r}{r_o}\right)^3+\frac{1}{2^2 4^2 6}\left(\frac{r}{r_o}\right)^5\right]$$

$$\times 1+\cdots\bigg]=\frac{1}{2}\frac{zr}{r_o^2}+\frac{1}{48 2r_o^4}(4z^3 r-3zr^3)$$

$$+\frac{1}{1920 r_o^6}(8z^5 r-20 z^3 r^3+5r^5)+\cdots \quad (27)$$

yield polynomials in $r$ and $z$ which, when multiplied by $\sin\varphi$ or $\cos\varphi$ represent the tesseral harmonics of the first order ($m=1$) of odd and even degrees respectively.

The tesseral harmonics of the second order and of even or odd degrees are obtained similarly by multiplying by $\sin\varphi$ or $\cos 2\varphi$ the polynomials in $z$ and $r$ obtained from the two expansions written below:

$$J_2\left(\frac{r}{r_o}\right)\cos h\frac{z}{r_o}=\left[\frac{1}{2\cdot 4}\left(\frac{r}{r_o}\right)^2-\frac{1}{2^2\cdot 4\cdot 6}\left(\frac{r}{r_o}\right)^4\right.$$

$$\left.+\frac{1}{2^2\cdot 4^2\cdot 6\cdot 8}\left(\frac{r}{r_o}\right)^6\cdots\right]\times\left[1+\frac{1}{2!}\left(\frac{z}{r_o}\right)^2+\cdots\right]$$

$$=\frac{1}{8}\frac{r^2}{r_o^2}+\frac{1}{\phi 6 r_o^4}(6z^2 r^2-r^4)+\frac{1}{3072 r_o^6}(16z^4 r^2-16 z^2 r^4+r^6)+\cdots \quad (28)$$

and $$J_2\left(\frac{r}{r_o}\right)\sin h\frac{z}{r_o}=\left[\frac{1}{2\cdot 4}\left(\frac{r}{r_o}\right)^2-\frac{1}{2^2\cdot 4\cdot 6}\left(\frac{r}{r_o}\right)^4+\cdots\right]$$

$$\times\left[\frac{z}{r_o}+\frac{1}{3!}\left(\frac{z}{r_o}\right)^3+\cdots\right]=\frac{1}{8}\frac{zr^2}{r_o^3}+\frac{1}{96 r_o^5}(2z^3 r^2-zr^4)+\cdots \quad (29)$$

The polynomials yielding the tesseral and sectarial harmonics of the third order are obtained from the expansions $$J_3\left(\frac{r}{r_o}\right)\cos h\frac{z}{r_o}=\left[\frac{1}{2\cdot 4\cdot 6}\left(\frac{r}{r_o}\right)^3-\frac{1}{2^2\cdot 4\cdot 6\cdot 8}\left(\frac{r}{r_o}\right)^5\right.$$

$$\left.+\cdots\right]\left[1+\frac{1}{2!}\left(\frac{z}{r_o}\right)^2\cdots\right]=\frac{1}{48}\left(\frac{r}{r_o}\right)^3$$

$$+\frac{1}{768 r_o^5}(8z^2 r^3-r^5)+\cdots \quad (30)$$

and $$J_3\left(\frac{r}{r_o}\right)\sin h\frac{z}{r_o}=\left[\frac{1}{2\cdot 4\cdot 6}\left(\frac{r}{r_o}\right)^3-\frac{1}{2^2\cdot 4\cdot 6\cdot 8}\left(\frac{r}{r_o}\right)^5\right.$$

$$\left.+\cdots\right]\left[\frac{z}{r_o}+\frac{1}{3!}\left(\frac{z}{r_o}\right)^3+\cdots\right]=\frac{1}{48}\frac{zr^3}{r_o^4}$$

$$+\frac{1}{2304 r_o^6}(8z^3 r^3-3zr^5)+\cdots \quad (31)$$

and by multiplication by $\sin 3\phi$ or $\cos 3\phi$. It will be noted that the sectorial harmonics are obtained in all cases from the first term of the last member in the expressions 26, 28, and 30.

The several expansions given above each contain several harmonics, and the next step will be the determination of combinations of these expressions which contain essentially a single spherical harmonic of low order. This is accomplished by making the proper choice for the determination of the scale factor $r_o$ which will be designated by $r_1$, $r_2$, $r_3$, etc. in a linear combination of several expressions of the form of Equations 29 or 30. For instance, it can be easily verified that this procedure results in the following expression $$r_1^6(r_2^2-r_3^2)J_0\left(\frac{r}{r_1}\right)\cos h\frac{z}{r_1}+r_2^6(r_3^2-r_1^2)J_0\left(\frac{r}{r_2}\right)\cos h\frac{z}{r_2}$$

$$+(r_3^6(r_1^2-r_2^2)J_0\left(\frac{r}{r^3}\right)\cos h\frac{z}{r_3} \quad (32)$$

contains 2nd degree terms, no 4th and contains no 6th degree terms, and higher degree terms. The higher degree terms have numerical coefficients which are quite small, and furthermore contain terms of the form $$\frac{z^{2i}y^{2k}}{r_i^{2i+2k}}\ (i=1,2,3)$$

which are numerically very small in the center of the air gap; for these reasons they can be neglected, and expression 32 will be utilized as a basis for the determination of windings designed to cancel field inhomogeneities expressible as zonal harmonics of the second degree. (Such inhomogeneities may be very high when the magnetization of both halves of the magnet are unequal, and are sometimes referred to as "coning" of the field).

Two further approximations will be made. Firstly, the harmonics defined by the several expressions given above extend indefinitely in the radial directions, albeit they decrease approximately with the inverse square root of the distance $r$; but since the pole pieces are of finite extent, it will be assumed necessary, for practical reasons, that the windings need not be extended beyond the edge of the pole pieces. Secondly, for these purposes the pole pieces will be assumed to consist of magnetic material sufficiently high permeability so that their effect in relation to the current-traversed windings in contact with them will be sufficiently closely approximated by a succession of winding images, similar in their indefinite extent to the succession of images one sees of one self, from a place between two plane parallel mirrors. These virtual windings will have currents of the same amplitude and either in the same, or in alternating directions, depending upon whether the actual two windings on the pole pieces have currents in the same ($n=2$; $m=1$; $n=3$; $m=0$ and 2, etc.) or in opposite ($n=2$, $m=0$ and 2; $n=3$, $m=1$ and 3, etc.) directions.

The repetitive character of the field, with or without alternation of signs, between the succession of winding images just described makes it possible to determine the current in the windings from the magnetic potential in the central space (the air gap) alone. The relation between the field and the winding current derives from the vectorial expression.

$$\vec{i}=\text{curl}\ \vec{H} \quad (33)$$

where $i$ designates the current density in space. When $i_x$ and $i_y$ designate the current density within a plane winding of negligible thickness, the field on one side of the winding (matched by an opposite field of equal intensity on the other) is given by the expressions:

$$i_x=-By=-\frac{\partial\mu}{\partial y}\quad iy=B_x=\frac{\partial\mu}{\partial x} \quad (34)$$

A corollary of which is the current conservation equation $$\frac{\partial ix}{\partial x}+\frac{\partial iy}{\partial y}=0 \quad (35)$$

Relations 34 may be interpreted with the picture that if the magnetic potential $\mu$ is mapped on the $xy$ plane, a plane normal to the $z$-axis, by means of contour lines along the $i$th, one of which $\mu$ has a constant value, $$\mu=\mu_o+i\Delta\mu_o$$

which differs from the value along adjacent contour $i_y$, the predetermined amount $\Delta\mu_o$ which is fixed for any one mapping. The current density will be in the direction of the contour lines, and proportional to the slope which is itself proportional to the inverse distance between neighboring lines. As is illustrated by FIGS. 3 through 10, the windings may be thus easily determined and formed by establishing the family of contour lines 20 on the surface of a conductive foil 21. The conductor foil 21 is etched away along the lines 20. However, instead of closing each line 20 on itself, it is connected to the next line 20 along a path so chosen as to cut all lines 20 approximately prependicularly. Thus, if the map of the potential function represents a single rounded "hill," the current path of the conductive foil 21 between the lines 20 will be first between the base of the hill and the next higher contour line, then between that line and the next, etc., until the top of the hill is reached. The return path of the current may be completed through a hole (marked by minute circles in FIGS. 3 through 10) through the copper foil 21 and insulation aggrete described earlier, and then "down the hill" on a path cut in the copper foil of the reverse side of the laminate so as to match the path along which the contour lines were interrupted and joined to the next. This disposition of the current path minimizes what small effect these interruptions may have on the symmetry of the desired harmonic.

Thus far, the choice of the three scale factors, $r_1$, $r_2$ and $r_3$, introduced above has been left as a matter of arbitrary choice, except that they should, of course, be different from each other. A suitable method for determining their values consists in specifying that a given field intensity should be produced with minimum expenditure of electrical energy in the coils. This determination need not be carried out with great accuracy, for a determination of order of magnitude only is of concern here.

The amplitude of the field inhomogeneity produced by the term $$r_1^6(r_2^2-r_3^2) J_0\left(\frac{r}{r_1}\right) \cos h\frac{z}{z_1}$$

is proportional to $r_1^4(r_2^2-r_3^2)$ and the intensity of the field inhomogeneity produced by the three terms of 32 is proportional to $$[r_1^4(r_2^2-r_3^2)+r_2^4(r_3^2-r_1^2)+r_3^4(r_1^2-r_2^2)]^2 \quad (36)$$

The expenditure of electrical energy in the coil for the production of the first term is proportional to $$[r_1^6(r_2^2-r_3^2)]^2 \int (i_x^2+i_y^2) dx dy \quad (37)$$

where $$i_x^2+i_y^2=i_0^2=\left(\sum_i \frac{\partial J_0\left(\frac{r}{r_i}\right)}{\partial r} \cos h\frac{z_0}{r_i}\right)^2 \quad i=1,2,3 \quad (38)$$

and where $z_m$ designates the half gap width.

It may be worth noting that integral (37) would be infinite if carried across the whole plane defined by the pole face, but the integration is perforce limited to the pole face only.

We have $$\frac{\partial J_0\left(\frac{r}{r_0}\right)}{\partial r}=\frac{1}{r_0}J_1\left(\frac{r}{r_0}\right) \quad (39)$$

and the integral in 37 may be written $$\int (i_x^2+i_y^2) dx dy = \int_0^{\infty} i_\phi^2 r dr = \cos h^2\frac{z_n}{r_0}\int_0^{R/r_0} J_1^2(\mu)\mu d\mu \quad (40)$$

Since the $$\cos h^2\frac{z_m}{r_1}$$

factor dominates by orders of magnitude the value of the integral written after it, we may simply assume the value of this integral to be the same for the three values $r_1$, $r_2$ and $r_3$. Furthermore, the near orthogonality of the three terms of 32 permits us to ignore the cross product terms in 38. With these simplifications 37 becomes merely $$r_1^{12}(r_2^2-r_3^2)^2 \cos h^2\frac{z_m}{r_1}+r_2^{12}(r_3^2-r_1^2)^2 \cos h^2\frac{z_m}{r_2} \quad (41)$$

When minimal values are sought for the ratio of 41 over 36:

$$\frac{r_1^{12}(r_2^2-r_3^2)^2 \cos h^2\frac{z_m}{r_1} + r_2^{12}(r_3^2-r_1^2)^2 \cos h^2\frac{z_m}{r_3} + r_3^{12}(r_1^2-r_2^2)^2 \cos h^2\frac{z_m}{r_3}}{[r_1^4(r_2^2-r_3^2)+r_2^4(r_3^2-r_1^2)+r_3^4(r_1^2-r_2^2)]^2} \quad (42)$$

they are found to be in the neighborhood of $$r_1=.7z_m, \quad r_2=.24z_m \text{ and } r_3=.12z_m$$

(as well as, of course the other five points obtained by permuting the indexes of the $r$'s).

The calculations for the other harmonics are quite similar, except for the introduction of two refinements.

The first refinement concerns the effect of placing the windings, not against the pole pieces themselves, like the $n=2$ $n=m$ winding just discussed, but at a certain distance $z_i$ from the pole face because of the separation provided by the other windings nearer the pole face. Due to this separation, the effect of the winding and its image in the pole face may no longer be lumped as that of a single winding, but must be calculated with more precision.

If, for a fixed $\varphi$, the potential within the gap and up to the winding is given by expressions of the form $$\mu = J_m\left(\frac{r}{r_0}\right) \cos h\frac{z}{r_0} z < z_m - z_i \quad (44)$$

which correspond to the case of windings with currents in opposite directions on the two pole pieces because the slope of $$\cos h\frac{z}{r_0}$$

changes sign with the sign of $z$, the potential between either winding and its near image in the pole face, with current in the same direction, will be of the form $$\mu_1 = k J_m\left(\frac{r}{r_0}\right) \sin h\frac{z-z_m}{r_0} z > z_m - z_i \quad (45)$$

where $k$ is determined by the condition that derivatives of $\mu$ and $\mu_1$ with respect to $z$ must match on both sides of the winding, since there must be no discontinuity in the magnetic field normal to these windings (an apparent discontinuity in the potential itself is of no import, and results only from the desire not to carry a meaningless integration constant across the windings, for it is the variations of $\mu$ and $\mu_1$ which are of physical interest).

The conditions just stated for the derivatives of $\mu$ and $\mu_1$ yields.

$$k = \frac{\sin h\frac{z_m-z_i}{r_0}}{\cos h\frac{z_i}{r_0}} \quad (46)$$

The current within the winding will be calculated with the potential difference $\mu-\mu_1$ at the winding $$\mu-\mu_1 = J_m\left(\frac{r}{r_0}\right)\left[\cos h\frac{z_m-z_i}{r_0} - \frac{\sin h\frac{z_m-z_i}{r_0}\sin h\left(-\frac{z_i}{r_0}\right)}{\cos h\frac{z_i}{r_0}}\right]$$

$$= J_m\left(\frac{r_0}{r}\right)\frac{\cos h\left(\frac{z_m}{r_0}\right)}{\cos h\frac{z_i}{r_0}} \quad (47)$$

An entirely similar calculation would show that the current required in a winding at a distance $z_i$ from a pole face in order to produce a potential function $$\mu = J_m\left(\frac{r}{r_o}\right) \sin h\left(\frac{z}{r_o}\right) \quad (48)$$

must be calculated from the expression $$\frac{J_m\left(\frac{r}{r_o}\right) \sin h \frac{z_m}{r_o}}{\cos h \frac{z_i}{r_o}} \quad (49)$$

The refinements indicated by 47 and 49 need not be of concern when calculating the approximate scale factors ($r_1$, $r_2$, $r_3$, etc.) required for a good electrical efficiency, but once these scale factors have been determined, 47 and 49 must be utilized to determine the actual windings required to produce the desired harmonics.

The second refinement referred to above consists in departing slightly from the scale factors calculated with the method outlined earlier, and so choosing them that at the outside of the windings the several Bessel functions utilized have zeros. This procedure has two virtues. First, it minimizes the effect of interrupting the theoretically infinitely extended solution, because of the function interrupted would have provided only half the distance between two consecutive zeros with current in one direction rather than a whole distance between two consecutive zeros with current in the reverse direction, etc. Second, it insures that the last theoretical winding edge (contour line) coincides with the actual edge of the pole face, because the potential function formed with several Bessel functions which have their zeros on the edge has itself a zero on the edge.

The several other functions similar to 32 and processed with the general method outlined above, together with the expressions similar to 42 which were minimized to obtain a rough range of values for the several $r$'s are listed below:

$$\mu = [r_1^5(r_2^4 - r_3^4) J_0\left(\frac{r}{r_1}\right) \sin h \frac{z}{r_1}$$
$$+ r_2^5(r_3^4 - r_1^4) J_0\left(\frac{r}{r_2}\right) \sin h \frac{z}{r_2}$$
$$+ (r_3^5)(r_1^4 r_2^4) J_0\left(\frac{r}{r^3}\right) \sin h \frac{z}{r_3} \quad (50)$$

Min of:

$$\frac{r_1^{10}(r_2^4 - r_3^4) \sin h \frac{2z_m}{r_1} + r_2^{10}(r_3^4 - r_1^4) \sin h \frac{2z_m}{r_2} + r_3^{10}(r_1^4 - r_2^4) \sin h \frac{2z_m}{r_3}}{[r_1^2(r_2^4 - r_3^4) + r_2^2(r_3^4 - r_1^4) + r_3^1(r_1^4 - r_2^4)]_2} \quad (51)$$

Neighborhood of: $r_1 =$ arbitrarily large, $r_2 = .38\ z_m$, $r_3 = .11\ z_m$ (52)

$$n = 2, m = 1$$

$$\mu = r_1^6(r_2^2 - r_3^2) J_1\left(\frac{r}{r_1}\right) \sin h \frac{z}{r_1}$$
$$+ r_2^6(r_3^2 - r_1^2) J_1\left(\frac{r}{r_2}\right) \sin h \frac{z}{r_2}$$
$$+ r_{36}(r_1^2 - r_2^2) J_1\left(\frac{r}{r_3}\right) \sin h \frac{z}{r_3}\Big] \begin{matrix}\sin \varphi \\ \cos \varphi\end{matrix} \quad (53)$$

Min of:

$$\frac{r_1^{12}(r_2^2 - r_3^2) \sin h^2 \frac{z_m}{r_1} + r_2^{12}(r_3^2 - r_1^2)^2 \sin h \frac{2z_m}{r_2} + r_3^{12}(r_1^2 - r_2^2) \sin h^2 \frac{z_m}{r_3}}{[r_1^4(r_2^2 - r_3^2) + r_2^4(r_3^2 - r_1^2) + r_3^4(r_1^2 - r_2^2)]^2} \quad (54)$$

Neighborhood of: $r_1 = .84\ z_m$, $r_2 = .22\ z_m$, $r_3 = .12\ z_m$ (55)

$$n = 2, m = 2$$

$$N = \left[r_1^6(r_2^2 - r_3^2) J_2\left(\frac{r}{r_1}\right) \cos h \frac{z}{r_1}\right.$$
$$+ r_2^6(r_3^2 - r_1^2) J_2\left(\frac{r}{r_2}\right) \cos h \frac{z}{r_2}$$
$$\left.+ r_3^6(r_1^2 - r_2^2) J_2\left(\frac{r}{r_3}\right) \cos h \frac{z}{r_3}\right] \begin{matrix}\sin 2\varphi \\ \cos 2\varphi\end{matrix} \quad (56)$$

Min of:

$$\frac{r_1^{12}(r_2^2 - r_3^2)^2 \cos h^2 \frac{z_m}{r_1} + r_2^{12}(r_3^2 - r_1^2)^2 \cos h^2 \frac{z_m}{r_2} + r_3^{12}(r_1^2 - r_2^2) \cos h^2 \frac{z_m}{r_3}}{[r_1^4(r_2^2 - r_3^2) + r_2^4(r_3^2 - 2_1^2) + r_3^4(r_1^2 - r_2^2)]^2} \quad (57)$$

Neighborhood of:

$$r_1 = .74\ z_m,\ r_2 = .24\ z_m,\ r_3 = .12\ z_m \quad (58)$$

$$n = 3, m = 1$$

$$\mu = \left[r_1^5(r_2^4 - r_3^4) J_1\left(\frac{r}{r_1}\right) \cos h \frac{z}{r_1} + r_2^5(3^4 - r_1^4) J_1\left(\frac{r}{r_2}\right) \cos h \frac{z}{r_2} + r_3^5(r_1^4 - r_2^4) J_1\left(\frac{r}{r_3}\right) \cos h \frac{z}{r_3}\right] \begin{matrix}\sin \phi \\ \cos \phi\end{matrix} \quad (59)$$

Min of:

$$\frac{r_1^{10}(r_2^4 - r_3^4)^2 \cos h^2 \frac{zm}{r_1} + r_2^{10}(r_3^4 - r_1^4)^2 \cos h^2 \frac{zm}{r_2} + r_3^{10}(r_1^4 - r_2^4)^2 \cos h^2 \frac{zm}{r_3}}{[r_1^2(r_2^4 - r_3^4) + r_2^2(r_3^4 - r_1^4) + r_3^2(2_1^4 - r_2^4)]^2} \quad (60)$$

Neighborhood of:

$$r_1 = z_m,\ r_2 = .4\ z_m,\ r_3 = .16\ z_m \quad (61)$$

For the cases $n = 3$, $m = 2$, and $n = 3$, $m = 3$, the possibility of production of first order potentials is eliminated by considerations of symmetry, since there are no terms containing $\sin 2\varphi$ and $\sin 3\varphi$ in first order harmonics. For these cases, the elimination of fifth order harmonics only need be provided and this is accomplished by the judicious combination of only two potential functions. We have, for these two cases, $$n = 3, m = 2$$

$$\mu = \left[r_1^5 J_2\left(\frac{r}{r_1}\right) \sin h \frac{z}{r_1} - r_2^5 J_2\left(\frac{r}{r_2}\right) \sin h \frac{z}{r_2}\right] \begin{matrix}\sin 2\phi \\ \cos 2\phi\end{matrix} \quad (62)$$

Min of:

$$\frac{r_1^{10} \sin h^2 \frac{zm}{r_1} + r_2^{10} \sin h^2 \frac{zm}{r_2}}{(r_1^2 - r_2^2)^2} \quad (63)$$

Neighborhood of:

$$r_1 = .55\ z_m,\ r_2 = .16\ z_m \quad (64)$$

$$n = 3, m = 3$$

$$\mu = \left[r_1^5 J_3\left(\frac{r}{r_1}\right) \cos h \frac{z}{r_1} - r_2^5 J_3\left(\frac{r}{r^2}\right) \cos h \frac{z}{r_2}\right] \begin{matrix}\sin 3\phi \\ \cos 3\phi\end{matrix} \quad (65)$$

Min of:

$$\frac{r_1^{10} \cos h^2 \frac{zm}{r_1} + r_2^{10} \cos h^2 \frac{zm}{r_2}}{(r_1^2 - r_2^2)^2} \quad (66)$$

Neighborhood of:

$$r_1 = .44 \ z_m, \ r_2 = .15 \ z_m \quad (67)$$

The correction factor given by 47 and 49 for the several coils were calculated on the following basis:

1st coil: $n=2 \ m=0 \quad z_i = .02 \ z_m$
2nd coil: $n=3 \ m=0 \quad z_i = .04 \ z_m$
3rd and 4th coils: $n=2 \ m=1 \quad z_i = .07 \ z_m$
5th and 6th coils: $n=2 \ m=2 \quad z_i = .11 \ z_m$
7th and 8th coils: $n=3 \ m=1 \quad z_i = .15 \ z_m$
9th and 10th coils: $n=3 \ m=2 \quad z_i = .19 \ z_m$
11th and 12th coils: $n=3 \ m=3 \quad z_i = .23 \ z_m \quad (68)$ The basis of the corrections indicated above was predicated on the use of coil and insulation assemblies .015 inch thick for each coil, and of a total 1½ inch air gap.

The potential functions from the plots of the contours of which the actual windings were figured are listed below. All functions, except the first, were chosen with the restriction that they should have zeros at $r=2.83 \ z_m$, as the coils were intended for use in a magnet with a 1½ inch air gap and a 4¼ inch available circle diameter for placement of the coils on the pole pieces. These several functions are listed below:

1st coil, $n=2, \ m=0 \ \mu = J_o\left(1.46\frac{r}{z_m}\right)$ $$-.278 J_o\left(4.15\frac{r}{z_m}\right) + .237 J_o\left(8.16\frac{r}{z_m}\right) \quad (69)$$

2nd coil, $n=3, \ m=0 \ \mu = J_o\left(.849\frac{r}{z_m}\right)$ $$-3.24 J_o\left(3.06\frac{r}{z_m}\right) + 2.20 J_o\left(6.39\frac{r}{z_m}\right) \quad (70)$$

3rd and 4th coils, $n=2, \ m=1 \ \mu = \left[J_1\left(1.353\frac{r}{z_m}\right)\right.$ $$\left. -.294 J_1\left(4.705\frac{r}{z_m}\right) + .284 J_1\left(8.036\frac{r}{z_m}\right)\right] \begin{array}{c}\cos \phi \\ \sin \phi\end{array} \quad (71)$$

5th and 6th coils, $n=2, \ m=2 \ \mu = \left[J_2\left(1.813\frac{r}{z_m}\right)\right.$ $$\left. -.419 J_2\left(4.103\frac{r}{z_m}\right) + .277 J_2\left(8.57\frac{r}{z_m}\right)\right] \begin{array}{c}\sin 2\phi \\ \cos 2\phi\end{array} \quad (72)$$

7th and 8th coils, $n=3, \ m=1 \ \mu = \left[J_1\left(1.353\frac{r}{z_m}\right)\right.$ $$\left. -1.533 J_1\left(2.477\frac{r}{z_m}\right) + .473 J_1\left(6.93\frac{r}{z_m}\right)\right] \begin{array}{c}\sin \phi \\ \cos \phi\end{array} \quad (73)$$

9th and 10th coils, $n=3, \ m=2 \ \mu = \left[J_2\left(1.813\frac{r}{z_m}\right)\right.$ $$\left. -1.06 J_2\left(6.342\frac{r}{z_m}\right)\right] \begin{array}{c}\sin 2\phi \\ \cos 2\phi\end{array} \quad (74)$$

11th and 12th coils, $n=3, \ m=3 \ \mu = \left[J_3\left(2.253\frac{r}{z_m}\right)\right.$ $$\left. -.167 J_3\left(6.854\frac{r}{z_m}\right)\right] \begin{array}{c}\sin 3\phi \\ \cos 3\phi\end{array} \quad (75)$$

The coils illustrated in FIGS. 3 through 10 were designed to have a minimum spacing of .020 inch between successive coil turns and each etched turn to have a minimum width of .020 inch. Thus, a total minimum distance of .040 inch per turn determined the difference $\Delta u_0$ between the successive values of the potential functions for which the contours would, in turn, determine the configuration of the individual coil turns. The shape of the coil returns on the rear conductive layer of the photoetched laminates were selected, as previously explained, to minimize the effect of the offsets where the current passes from one contour to the next.

Figure 9:
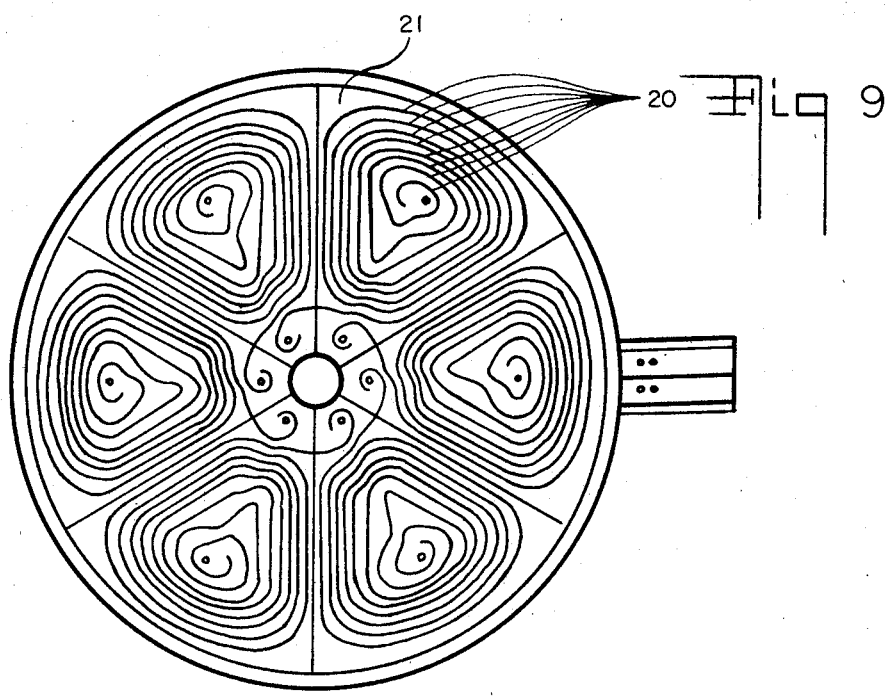
Figure 10:
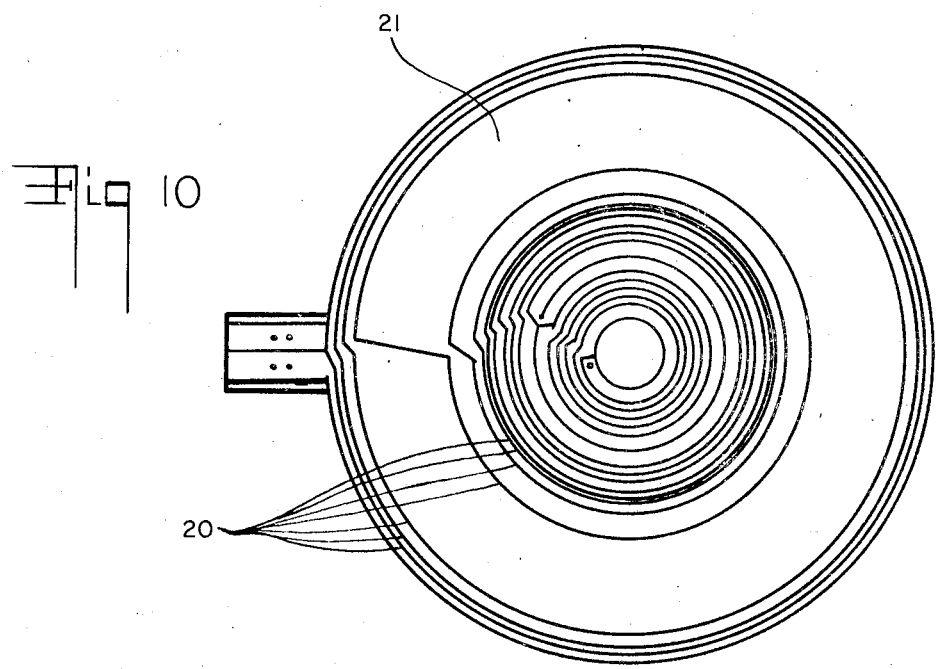
Figure 11:
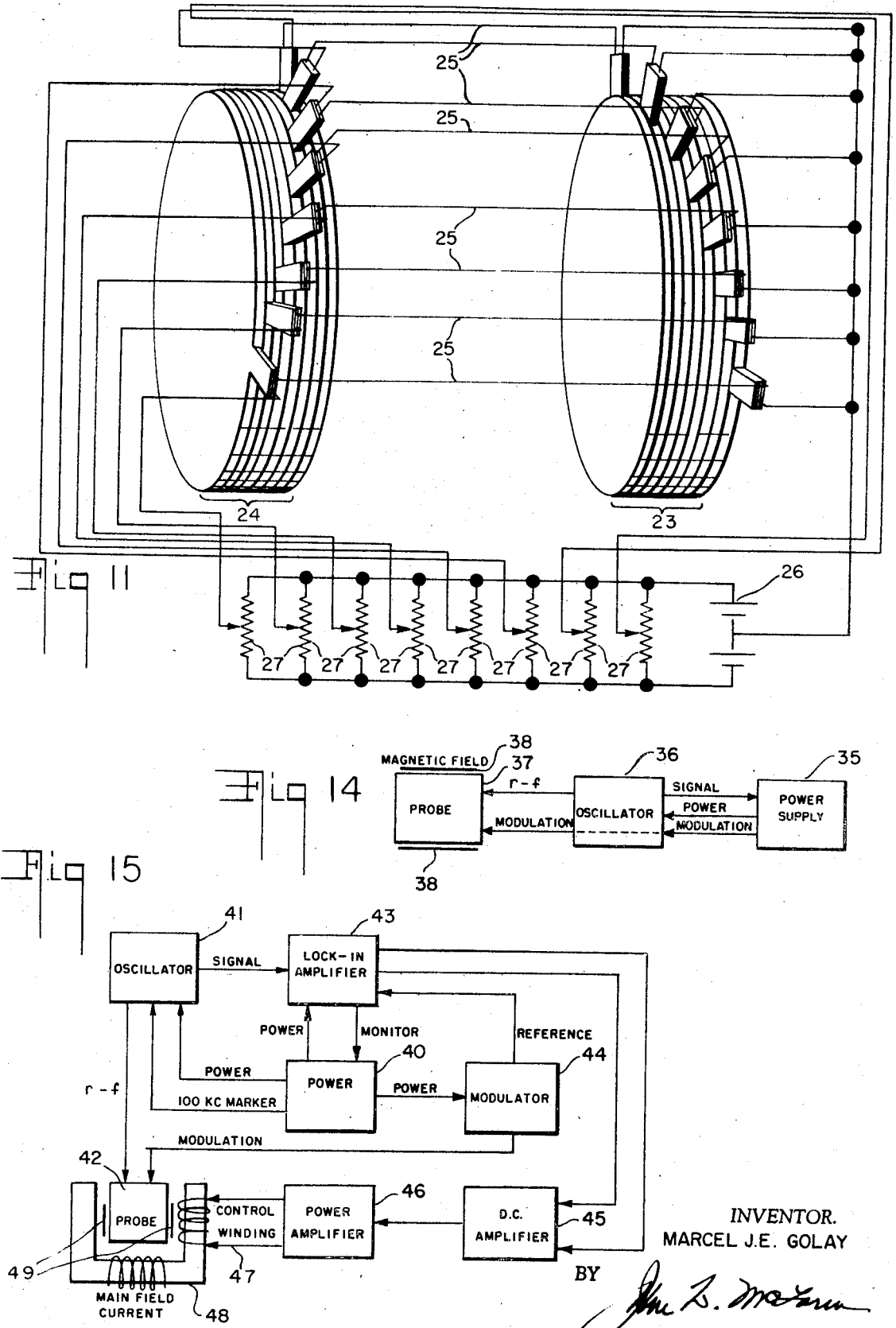
FIG. 11 illustrates an arrangement by which the coils of the present invention may be connected to a source of electrical energy and the flow of current separately controlled through each coil.

The photoetched printed circuit laminate coils, such as those illustrated by FIGS. 3 through 10 are arranged in two principal groups 23 and 24 as shown in FIG. 11. Each group of coils is placed adjacent to the space in which it is desired to homogenize the magnetic field. Thus, each group of coils as illustrated in FIG. 11 may be placed adjacent the pole of a magnet, for instance.

The order in which the coils of FIGS. 3 to 10 are positioned in FIG. 11 is summarized as follows reading in the direction from the gap to the pole (in FIG. 11, left to right for group 23 and right to left for group 24):

| Circuit type | No. per pole | Harmonics |
|---|---|---|
| FIG. 3 | 1 | $n=2$ $m=0$ |
| FIG. 6 | 1 | $n=3$ $m=0$ |
| FIG. 4 | 2 | $n=2$ $m=1$ |
| FIG. 5 | 2 | $n=2$ $m=2$ $m=2$ |
| FIG. 7 | 2 | $n=3$ $m=1$ |
| FIG. 8 | 2 | $n=3$ $m=2$ |
| FIG. 9 | 2 | $n=3$ $m=3$ |
| FIG. 10 | 1 | $n=4$ $m=0$ |

Each coil within a gorup has a related counterpart in the other group so that the coils are matched in related pairs. Each coil is electrically interconnected by a lead 25 with the other with which it is paired and, in turn, connected to a source of electrical energy 26 such as the battery illustrated in FIG. 11. A variable potentiometer other other appropriate control device is included in the circuit connecting each pair of coils to the source of electrical energy 26 so that the flow of current through each pair of coils may be individually and separately controlled. Due to the operational orthogonality of the coils of the present invention, the effect of each pair of coils upon the magnetic field it is desired to control may be separately adjusted to its optimal setting without regard to the adjustment of current flow in the other coils. The operational orthogonality of the present invention is such that the adjustment of the flow of current through one pair of coils has no perceptible effect on any of the other pairs of coils and, as a result, a first adjustment of current through each of the pairs of coils followed by minor readjustment as may appear necessary is all that is usually required in the use of the present invention.

This is in sharp contrast to prior art arrangements of coils which do not possess operational orthogonality and, as a consequence, necessarily require readjustment of each coil upon any change in the current flow in any other coil. In typical prior art arrangements, the several coils are so inextricably related through magnetic linkage that it is often virtually impossible to ascertain the optimal setting of each individual coil.

The present invention overcomes this basic and fundamental deficiency as has been disclosed and taught herein.

In the operation of the present invention, the several windings, such as illustrated in FIGS. 1a to 2g, or in FIGS. 3 to 10, are each connected to a source of electrical energy with means for separately controlling the flow of current through the coils as illustrated in FIG. 11.

Thus, the current control means employed with the embodiment which utilizes spherical windings may be the same in principle as that shown in FIG. 11 which is used with the printed circuit photo-etched laminate embodiment of the present invention.

Figure 12:
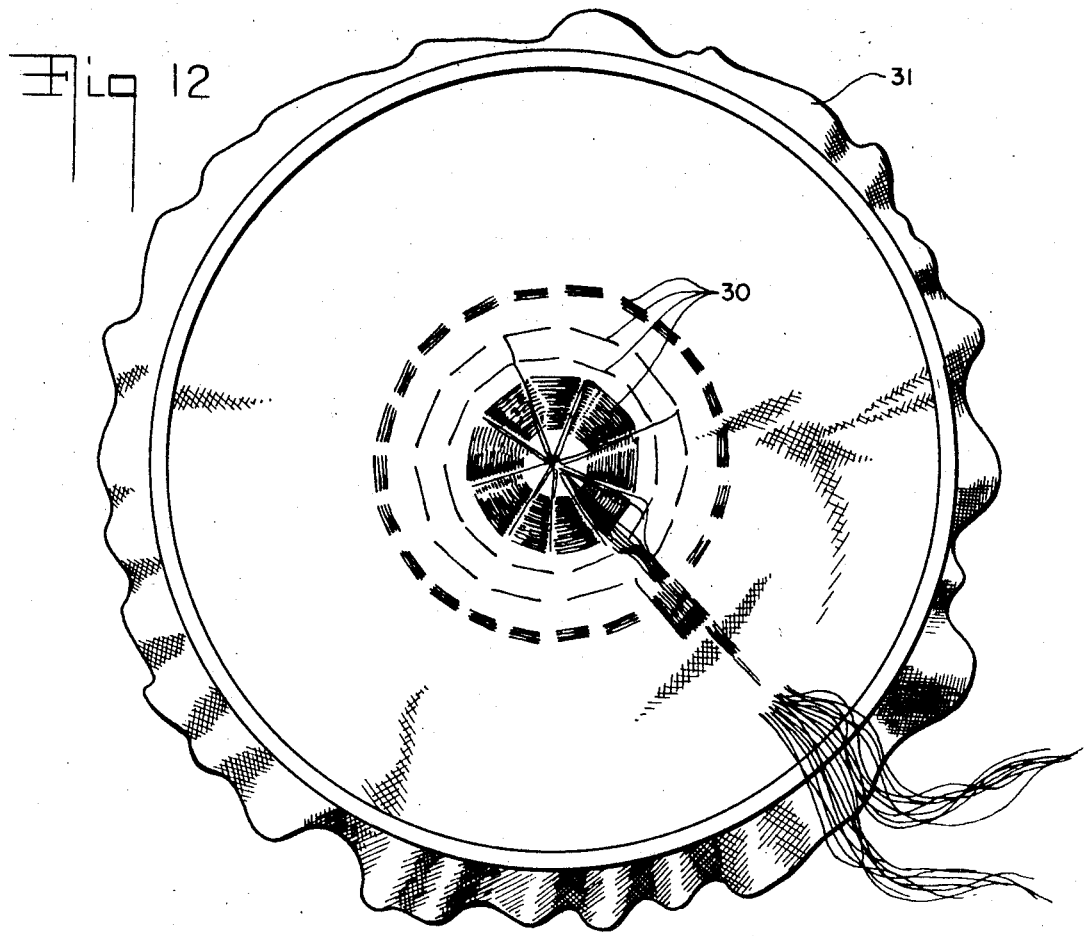
FIGS. 12 and 13 illustrate a variant embodiment of flat coils disposed and arranged as conceived and taught by the present invention.

In another embodiment of the invention, a plurality of conductive paths may be established in a nonconductive material by weaving fine wires through clothlike material. As is illustrated in FIGS. 12 and 13, the current paths defined by such wires 30 are disposed and arranged in accordance with the concept and teaching of the present invention to produce magnetic fields which are operationally orthogonal.

Figure 13:
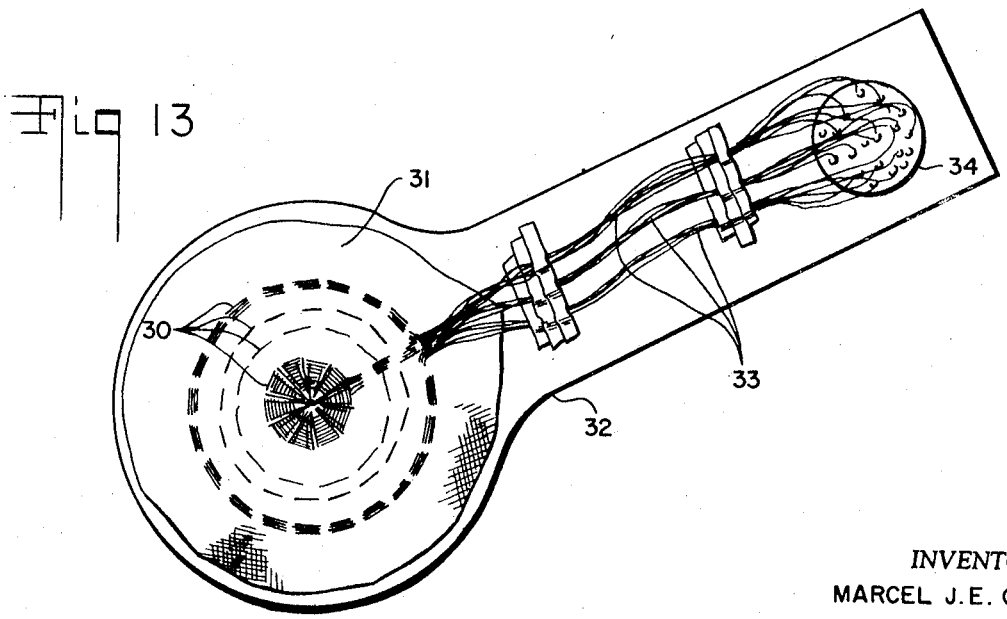

As is illustrated in FIG. 13, the coils 30 woven in the nonconductive material 31 may be affixed to a rigid support means 32, generally of a paddlelike configuration, and the several leads 33 from the plurality of coils 30 may be conveniently brought out to a multiple connector 34. The multiple connector 34, when connected to a source of electrical energy and potentiometers such as illustrated in FIG. 11, affords a means of supplying each coil with a separately controllable amount of electrical energy so that current flow through each of the plurality of coils may be individually adjusted.

If desired, windings fabricated in this manner may be potted in conventional fashion to produce a unitary assembly which may be handled in normal usage without damage to the coils or the connecting leads.

FIG. 14 illustrates a nuclear magnetic resonance Gaussmeter or magnetometer apparatus of the type customarily used to determine the strength of a magnetic field. This combination of apparatus comprises a power supply 35, a highly stable oscillator 36, which is tunable over a range of R.F. frequencies, and a nuclear magnetic resonance probe 37. The oscillator 36 feeds its signal to the nuclear magnetic resonance probe 37 which may be substantially of the type disclosed in Pat. No. 2,756,383.

Flat coils 38 of the kind previously described in two embodiments of the present invention may be positioned adjacent the probe 37 which in turn is in the magnetic field it is desired to measure. The coils 38 of the present invention are adapted to be connectable to a source of electrical energy (not shown), and the flow of current through each coil is separately controllable in accordance with the concept and teaching of the present invention. The coils of the present invention may also be physically located within and incorporated as part of a nuclear magnetic resonance probe if desired.

Generally, nuclear magnetic resonance measurements have enhanced accuracy as the magnetic field in which the probe operates is made more uniform. Therefore, it is highly desirable in a Gaussmeter or magnetometer type of apparatus that provisions be made to improve the uniformity and homogeneity of the field to be measured so that the intensity of the magnetic field may be more accurately determined.

As will be readily appreciated by those skilled in the nuclear magnetic resonance instrumentation art, the present invention may be employed in apparatus utilizing a manifestation of the nuclear magnetic resonance phenomenon for the purpose of stabilizing the intensity of a magnetic field or varying the intensity of the magnet field in accordance with some predetermined function. The magnetic field stabilization system illustrated in FIG. 15 consists of a power supply 40, an oscillator 41, and a probe 42 substantially of the kind used in the magnetometer apparatus of FIG. 14 and operating upon the principles of nuclear magnetic resonance.

The oscillator 40 produces a highly stable R.F. signal which is fed to the probe 41 containing a sample of isotopic chemical material. The isotopic material will absorb R.F. power when the frequency of the applied R.F. signal coincides with the resonant frequency which is characteristic of the nuclei of the sample. The oscillator 41 detects the absorption of R.F. power and the detected nuclear resonance signal is fed to a lock-in amplifier 43. A modulator 44 provides a reference signal which is compared with the nuclear resonance absorption signal in the lock-in amplifier 43, producing a difference signal. The difference signal is amplified in a D.C. amplifier 45 which drives a power amplifier 46, supplying electrical energy to the control winding 47 of a magnet 48 so as to adjust the intensity of the magnetic field produced by the magnet and maintain the intensity of its magnetic field constant. A set of coils in two groups 49 is placed in the magnet gap proximate to the probe 42. The coils 49 are designed as conceived by the present invention and taught herein. The coils 49 are adapted to be connectable to a source of electrical energy and the current through each coil is separately controllable as shown in FIG. 11, or by equivalent means. Thus, the magnetic field being controlled by the system is rendered more uniform and a finer nuclear magnetic signal obtained to enhance and improve the accuracy of control.

FIG. 16 illustrates a nuclear magnetic resonance spectrometer of the absorption type which may be used to ascertain the presence and the identity of an isotopic sample. Nuclear magnetic resonance was first successfully detected by Professors Purcell and Pound of Harvard University in 1945 using absorption type apparatus as reported in The Physical Review, Volume 69, page 37. The sample is placed in the probe 50 which may be substantially of the type disclosed in Pat. 2,756,383. The probe 50 receives R.F. energy derived from a highly stable tunable oscillator 51. The oscilator 51 may be tuned manually by the operator or by an autoscan frequency drive, such as is commercially available as an accessory for this kind of equipment. When the frequency of the R.F. energy fed to the probe 50 coincides with the resonant frequency which is characteristic of the particular sample being investigated, R.F. power is absorbed by the sample and produces a signal which is fed to the power supply unit 52 of the spectrometer where it may be displayed by one of several types of conventional indicators, such as a cathode ray oscilloscope, for instance. A modulator 53 supplies a small magnetic field modulation to probe 50. Such modulation causes the detected R.F. absorption signal to be cyclically repetitive and thus permits A.C. amplification of the absorption signal. A lock-in amplifier 54 receives the nuclear resonance absorption signal where it is phase-detected and thence recorded on an appropriate recorder 55, which may be of the strip chart type. Calibration may be effected in any known manner. For example, a known signal from the power supply 52 may be passed to the probe. This will appear on the recorder as a calibration indicia for the recording of the signal produced by the sample.

In the use of this apparatus, a strip chart recorder may be made to record either the derivative of the absorption curve or the absorption curve directly. When low amplitudes of sine-wave modulation are used, the derivative of the absorption curve is recorded. When large amplitudes of square-wave modulation are used, the absorption curve is directly recorded. It is well known that high intensity magnetic fields are required for spectrometric analysis by nuclear magnetic resonance means. The degree of accuracy of such analysis is determined to a great degree by the uniformity and homogeneity of the magnetic field, as well as by its stability and a number of other factors. Accordingly, the present invention readily lends itself to the improvement of the magnetic field utilized in nuclear magnetic resonance equipment which is employed for analysis and basic research. The coils 56 of the present invention are positioned adjacent the probe 50 and the poles of the magnet 57 as shown in FIG. 16 and arranged for individually controllable current flow through each coil. The operational orthogonality of the present invention makes it possible to quickly and conveniently operate upon the magnetic field to advantageously and significantly improve the performance of nuclear magnetic resonance spectrometer equipment.

Similarly, as shown in FIG. 17, the present invention may be employed to significantly improve the performance of nuclear induction apparatus. One use of nuclear induction equipment is the detection of the characteristic resonant frequency of nuclei. However, nuclear induction techniques and apparatus are distinct from nuclear magnetic resonance absorption equipment, both in the combination of elements employed and their operation.

As shown in FIG. 17, typical nuclear induction equipment may comprise an R.F. transmitter 60 which supplies R.F. energy to an isotopic sample located within the several coils of the equipment positioned in the magnetic field produced by a magnet 61. A coil 62 couples R.F. energy to the sample. Instead of detecting absorption through the input means, nuclear induction equipment is characterized by an R.F. pick-up coil 63 in which there is induced a very small but measurable electromotive force when the R.F. energy transmitted to the sample through the input coil 62 coincides with the characteristic resonant frequency of the nuclei of the sample. Thus, instead of detecting the absorption manifestation of nuclear resonance, the nuclear induction technique uses the nuclei of the sample as the core of a transformer to transfer a portion of the R.F. input to a separate and distinct output coil which must be oriented so as not to be coupled with the R.F. input.

The electromotive force thus generated is amplified in an amplifier 64, detected in a detector 65, and displayed on a cathode ray oscilloscope 66 after being amplified in an audio amplifier 67. A magnetic field modulation, such as that derived from a 60-cycle supply 68, for instance, repetitively sweeps the magnetic field through resonance. The same modulation signal is also fed to the cathode ray oscilloscope 66 and thus the combination of signals received by the cathode ray oscilloscope provide a repetitive indication of resonance at the rate of 60 cycles per second having the appearance of a stationary pattern on the face of the cathode ray tube.

As shown in FIG. 17, coils 69 designed and fabricated in accordance with the teaching of the present invention may be placed adjacent to the poles of the magnet 61 employed in the nuclear induction apparatus and utilized to improve and perfect the uniformity and homogeneity of the magnetic field. Such coils are preferably of the photoetched printed circuit laminate type, but may be any convenient form to produce equivalent results as conceived and taught by the present invention.

The present invention, when employed with nuclear magnetic resonance equipment of either the absorption or nuclear induction type affords a means of conveniently and quickly effecting an improvement in the uniformity and homogeneity of the magnetic field employed which, it has been found in many cases, can improve the resolution and accuracy of the determinations made by the nuclear magnetic resonance equipment by an order of ten times or more over the accuracy and resolution which may be achieved without the use of the present invention.

Nuclear magnetic resonance equipment is a typical and apt illustration of the usefulness and applicability of the present invention, but its concept and utility is not restricted to such equipment. In any equipment or apparatus requiring an extremely high degree of uniformity of magnetic field or a particular configuration of magnetic field, the present invention may be advantageously employed. For instance, the present invention may be used to homogenize the magnetic field employed in electron paramagnetic resonance apparatus or similar and related kinds of equipment.

It has been found in the application of the present invention to nuclear magnetic resonance equipment that advantage may be taken of the improved results which are achieved by spinning the sample. The current flow of each of the coils of the present invention may be individually adjusted for optimum uniformity of the magnetic field, and then the sample may be spun to secure further improvement of the accuracy of nuclear magnetic resonance indications. In some cases it has been found preferable to follow the procedure of adjusting the coils of the invention to achieve an initial optimum setting, then to spin the sample and thereafter readjust the coils for corrected optimum settings with the sample spinning.

It is evident therefore from the methods outlined herein that the present invention may be advantageously employed with other techniques and methods which are also designed to improve the resolution and accuracy of nuclear magnetic resonance equipment, such as the sample spinning technique.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. Apparatus for producing a magnetic field in a predetermined space comprising means providing a plurality of electric circuits, each circuit comprising conductors connected to a current source, said conductors being disposed adjacent to said space to provide a component of the magnetic field in said space as current from said source passes through the circuit, means connected to each circuit to adjust the current in its said conductors, the conductors of each circuit describing a configuration defining a predetermined current path geometry for generating a magnetic field component, each of said components in said space being the gradient of a magnetic potential defined by one of a system of substantially orthogonal functions, at least one of said magnetic potential functions being of degree higher than the first.

2. Apparatus as defined in claim 1 in which the mutual inductances of the electric circuits are small relative to the self-inductances thereof.

3. Apparatus as defined in claim 1 in which the said electric circuits comprise windings on the surface of a hollow sphere.

4. Apparatus as defined in claim 1 in which the electric circuits comprise pairs of flat windings with the windings of each pair on opposite sides of the predetermined space.

5. Apparatus for producing a magnetic field in a predetermined space comprising means providing a plurality of electric circuits, each circuit comprising conductors connected to a current source, said conductors being disposed adjacent to said space to provide a component of the magnetic field in said space as current from said source passes through the circuit, means connected to each circuit to adjust the current in its said conductors, the conductors of each circuit describing a configuration defining a predetermined current path geometry for generating a magnetic field component, each of said components in said space being defined by one of a system of substantially orthogonal functions, at least one of said functions being of the first or higher degree.

6. Apparatus for producing a magnetic field in a predetermined space comprising means providing a plurality of electric circuits, each circuit comprising conductors in a plurality of parallel planes connected to a current source said conductors being disposed adjacent to said space, the current in said conductors producing an incremental component of the magnetic field in said space as current from said source passes through the circuit, means connected to each circuit to adjust the current in its said conductors, the conductors of said circuits describing respective configurations defining predetermined current path geometries for generating substantially non-interacting magnetic field components, each of said components in said space being the gradient of a magnetic potential defined by one of a system of substantially orthogonal functions of degree higher than the first, whereby each said incremental component may be individually and selectively controlled without materially affecting the adjustment of any other component.

7. Apparatus for producing a magnetic field in a predetermined space comprising means providing a plurality of electric circuits, each circuit including electroconductor means adapted to be connected to a current source and arranged to define a pair of parallel planes adjacent said space, the current in each electroconductor means providing an incremental component of the magnetic field in said space as current from the source passes through the circuit, means connected to each circuit to adjust the current in its electroconductor means, said electroconductor means describing respective configurations defining predetermined current path geometries for generating substantially non-interacting magnetic field components, each of said components in said space being the gradient of a magnetic potential defined by one of a system of substantially orthogonal functions of degree higher than the first.

8. Apparatus according to claim 7 wherein the parallel planes of each pair are disposed on opposite sides of said predetermined space.

9. Apparatus for producing a magnetic field in a predetermined space comprising means providing a plurality of electric circuits, each circuit comprising electroconductors forming planar current paths connected to a current source, said electroconductors being disposed adjacent to said space, the current in each said circuit producing an incremental component of the magnetic field in said predetermined space as current passes through the circuit, means connected to each circuit to adjust the current from said source therein, the electroconductors of each circuit describing a configuration defining a path geometry for generating a magnetic field compoent, each of said components in said space being the gradient of a magnetic potential defined by one of a system of substantially orthogonal functions of degree higher than the first whereby said incremental components may be individually and selectively controlled without materially affecting the adjustment of other components.

10. Apparatus as defined in claim 9 in which said planar current paths comprise printed circuits.

11. A nuclear magnetic resonance spectrometer comprising means for generating a magnetic field in a predetermined space; means for improving the uniformity of said magnetic field including a plurality of electric circuits, each circuit comprising coplanar conductors connected to a current source, said conductors being disposed adjacent to said space, the current in the conductors of each said circuit producing an incremental component of the magnetic field in said space as current from said source passes through the circuit, means connected to each circuit to adjust the current in its said conductors, the conductors of said circuits describing respective configurations defining predetermined current path geometries for generating substantially non-interacting magnetic field components, each of said components in said predetermined space being the gradient of magnetic potential defined by one of a system of substantially orthogonal functions of degree higher than the first, whereby each said incremental component may be individually and selectively controlled without materially affecting the adjustment of any other component; a variable R.F. oscillator; a probe including a sample space and an input coil connected to said oscillator for coupling R.F. energy to a sample located in said sample space; and means for relating a resonant absorption of energy by said sample to the frequency of said energy at which it occurs.

12. A nuclear magnetic resonance spectrometer comprising means for generating a magnetic field in a predetermined space; means for improving the uniformity of said magnetic field including a plurality of electric circuits, each circuit comprising electroconductor means connected to a current source and arranged to form a pair of parallel planes, said electroconductor means being disposed adjacent to said space, the current in each said electroconductor means producing an incremental component of the magnetic field in said space as current from said source passes through the circuit, means connected to each circuit to adjust the current in its said electroconductor means, said electroconductor means describing respective configurations defining predetermined current path geometries for generating substantially non-interacting magnetic field components, each of said components in said space being the gradient of a magnetic potential defined by one of a system of substantially orthogonal functions of degree higher than the first, whereby each said incremental component may be individually and selectively controlled without materially effecting the adjustment of any other component; a variable R.F. oscillator; a probe including a sample space and an input coil connected to said oscillator for coupling R.F. energy to a sample located in the said sample space; means for cyclically modulating said magnetic field; means for detecting the resonant absorption of R.F. energy by said sample; phase comparison means for producing a signal as a function of the phase of said resonant absorption wtih respect to said cyclic modulation; and means for recording said signal.

13. Apparatus for producing a highly homogenous magnetic field comprising a magnet having a pair of pole faces and a gap therebetween adapted to produce a first magnetic field in said gap, a plurality of electric circuits, each circuit comprising coplanar conductors connected to a current source, said conductors being located adjacent said gap, the current in said conductors providing an incremental component of an homogenizing magnetic field in said gap as current from said source passes through the circuit, means connected to each circuit to adjust the current in its said conductors, said conductors describing respective configurations defining predetermined current path geometries for generating substantially non-interacting magnetic field components, each of said components in said predetermined space being the gradient of a magnetic potential defined by one of a system of substantially orthogonal functions of degree higher than the first, whereby each said incremental component may be individually and selectively controlled without materially affecting the adjustment of any other component.

14. Apparatus as defined in claim 13 in which the electric circuits comprise electroconductors formed in flat parallel planes.

15. Apparatus for improving the homogeneity of a magnetic field comprising a plurality of separately energizable electric conductor means arranged on and curving with the surface of a sphere, an adjustable current varying means for each said conductor means, each conductor means being disposed to provide a corresponding homogenizing magnetic field component within said surface that is adjustable in accordance with adjustment of said current varying means, said conductor means being geometrically oriented on said surface to variously direct said components for independent optimal adjustment of each, without materially affecting the adjustment of any other, to thereby provide a resultant magnetic field region within said surface free of undesired inhomogeneities.

16. Apparatus for improving the homogeneity of a region of magnetic field comprising a first and second separately energizable electric conductor means arranged adjacent the region of magnetic field to be corrected, an adjustable current varying means for each said conductor means, each said conductor means being disposed to provide a corresponding homogenizing magnetic field component within said region of field that is adjustable in accordance with adjustment of said current varying means, said first and second conductor means being located in an orthogonal relation to each other and being geometrically oriented with respect to the region of field to variously direct said components and for independent optimal adjustment of each, without materially affecting the adjustment of the other, to thereby provide a resultant magnetic field region within said region of magnetic field free of undesired inhomogeneities.

17. A gyromagnetic resonance apparatus wherein precessions of gyromagnetic bodies disposed in a predetermined region of magnetic field are generated and detected including, means for improving the uniformity of the predetermined region of magnetic field including a plurality of electric circuits, each circuit connected to a current source, said circuits including conductors being disposed adjacent to said predetermined region of magnetic field, the current in said conductors producing an incremental component of the magnetic field in said predetermined region of magnetic field as current from said source passes through the circuit, means connected to each circuit to adjust the current in said conductors thereof, said conductors each describing respective configurations defining predetermined current path geometries for generating substantially non-interacting magnetic field components, each of said components in said predetermined region of magnetic field being the gradient of a magnetic potential defined by one of a system of substantially orthogonal functions of degree higher than the first, whereby each said incremental component may be individually and selectively controlled without materially affecting the adjustment of any other component.

18. Apparatus for improving the homogeneity of a magnetic field in a region of space comprising a plurality of separately energizable electric conductor means disposed adjacent said region, and adjustable current varying means for each said conductor means, each conductor means being disposed to provide a corresponding homogenizing magnetic field component in said region that is adjustable in accordance with adjustment of said current varying means, each of said conductor means being shaped to generate in said region a magnetic field component which is the gradient of a magnetic potential which is defined by a separate one of a system of orthogonal functions of degree higher than the first.

References Cited

UNITED STATES PATENTS

| | | | |
|---|---|---|---|
| 2,412,617 | 12/1946 | Jenkins | 114—240 X |
| 1,837,678 | 12/1931 | Ryder | 336—232 XR |
| 1,703,080 | 2/1929 | Beers | 336—232 XR |
| 2,265,041 | 12/1941 | Hipple | 336—230 XR |
| 2,830,212 | 4/1958 | Hanlet | 336—200 XR |
| 2,858,504 | 10/1958 | Nelson | 324—0.5 |
| 2,962,636 | 11/1960 | Purcell | 324—0.5 XR |

OTHER REFERENCES

Arnold, Physical Review, vol. 102, No. 1, Apr. 1, 1956, pp. 136–150.

Anderson, Physical Review, vol. 102, No. 1, April, 1956, pp. 151–167.

Volkoff et al., Canadian Journal of Physics, vol. 30, No. 3, 1952, pp. 270 and 277–282.

WILLIAM F. LINDQUIST, Primary Examiner

M. J. LYNCH, Assistant Examiner

U.S. Cl. X.R.

317—123; 336—200, 230, 236

PO-1050
(5/69)

UNITED STATES PATENT OFFICE
CERTIFICATE OF CORRECTION

Patent No. 3,515,979     Dated June 2, 1970

Inventor(s) Marcel J. E. Golay

It is certified that error appears in the above-identified patent and that said Letters Patent are hereby corrected as shown below:

```
Column  3, line 43,
        "    45 (all five occurrences),
        "    47,
        "    51;
Column  5, line  5,
        "    26,
        "    41,
        "    50 (both occurrences),
        "    62,
        "    67,
        "    68;
Column  6, line 13,
        "    28,
        "    63,
        "    71;
Column  7, line 36,
        "    65,
        "    75;
Column  8, line  3 (all four occurrences),
        "     9,
        "    24;
Column 10, line 60 (both occurrences),
        "    69,
        "    71,
        "    73;
Column 12, line 35,
        "    50,
        "    56,
        "    57,
        "    64,
        "    67;
Column 13, line  5,
        "    45,
        "    68;
```

UNITED STATES PATENT OFFICE
CERTIFICATE OF CORRECTION

Patent No. 3,515,979  Dated June 2, 1970

Inventor(s) Marcel J. E. Golay

It is certified that error appears in the above-identified patent and that said Letters Patent are hereby corrected as shown below:

Column 14, line 33,
" 60,
" 73;
Column 15, line 31,
" 37,
" 43,
" 50,
" 57,
" 63,
" 70;

for "$\mu$" read --u--.

Column 4, line 45,
" 62;

for "$\mu_i$" read --$u_i$--.

Column 4, line 46, for "$\mu_e$" read --$u_e$--.

Column 10, line 73 (both occurrences),
" 75;

for "$\mu_o$" read --$u_o$--.

Column 12, line 46,
" 50,
" 56,
" 58,
" 64,
" 67;

for "$\mu_1$" read --$u_1$--.

PO-1050 (5/69)

UNITED STATES PATENT OFFICE
CERTIFICATE OF CORRECTION

Patent No. 3,515,979　　　　　　Dated June 2, 1970

Inventor(s)　　　　　Marcel J. E. Golay

It is certified that error appears in the above-identified patent and that said Letters Patent are hereby corrected as shown below:

Column 8, line 9,
" 30,
" 55;
Column 9, line 3,
" 32,
" 55;
Column 12, line 47,
" 59,
" 66 (both occurrences);
Column 13, line 5,
" 11,
" 45,
" 47,
" 50,
" 56 (both occurrences),
" 58,
" 68,
" 70,
" 73;
Column 14, line 60 (both occurrences);

for "sin $\underline{h}$" read --sinh--.

Column 14, line 2,
" 5,
" 65 (both occurrences);

for "sin $\underline{h}^2$" read --$\sinh^2$--.

Column 14, line 5;

for "sin $\underline{h}\ \frac{2z_m}{r_2}$" read --$\sinh^2 \frac{z_m}{r_2}$--.

- 3 -

PO-1050
(5/69)

UNITED STATES PATENT OFFICE
CERTIFICATE OF CORRECTION

Patent No. 3,515,979      Dated June 2, 1970

Inventor(s) Marcel J. E. Golay

It is certified that error appears in the above-identified patent and that said Letters Patent are hereby corrected as shown below:

```
Column  8, line  9,
        "       30,
        "       35,
        "       40,
        "       67;
Column  9, line 21,
        "       44;
Column 10, line  3 (both occurrences),
        "        6;
Column 11, line 38, Column 12, line 35,
        "       41,
        "       61,
        "       67,
        "       71,
        "       74;
Column 13, line 12;
Column 14, line 12,
        "       15;
        "       17,
        "       33,
        "       35 (both occurrences),
        "       73 (both occurrences);
``` for "cos h" read --cosh--.

Column 12, line 69, for "cos" read --cosh--.

Column 11, line 66,
        " 71;
Column 12, line 5 (both occurrences),
       line 10,

UNITED STATES PATENT OFFICE
CERTIFICATE OF CORRECTION

Patent No. 3,515,979      Dated June 2, 1970

Inventor(s)      Marcel J. E. Golay

It is certified that error appears in the above-identified patent and that said Letters Patent are hereby corrected as shown below:

Column 12, line 11 (both occurrences);
Column 14, line 22,
" 25 (both occurrences),
" 41,
" 43 (both occurrences);
Column 15, line 3 (both occurrences);

for "cos $\underline{h}^2$" read --$\cosh^2$--.

Column 4, line 44,
" 46,
" 53,
" 54,
" 56,
" 57,
" 70;
Column 5, line 25,
" 33 (both occurrences),
" 41 (both occurrences),
" 43,
" 54 (both occurrences);
Column 6, line 13 (both occurrences),
" 15 (both occurrences),
" 18,
" 21,
" 29 (both occurrences),
" 31,
" 34,
" 51,
" 56,
" 60,
" 64 (both occurrences),
" 66;

- 5 -

UNITED STATES PATENT OFFICE
CERTIFICATE OF CORRECTION

Patent No. 3,515,979  Dated June 2, 1970

Inventor(s) Marcel J. E. Golay

It is certified that error appears in the above-identified patent and that said Letters Patent are hereby corrected as shown below:

Column 7, line 12;

for "$\underline{v}$" read --$\delta$--, i.e. the Greek letter delta lower case

Column 4, line 51, for "$i_v$" read --$i_\delta$--.

Column 4, line 53, i.e. in the denominator of the derivative $\frac{\partial u_1}{\partial \emptyset}$;

Column 5, line 61;
Column 8, line 4,
    " 9 (both occurrences);
Column 9, line 64 (both occurrences);
Column 14, line 35,
    " 36,
    " 59,
    " 60,
    " 72,
    " 73;
Column 15, line 45,
    " 46,
    " 52,
    " 53,
    " 59,
    " 60,
    " 65,
    " 66,
    " 72,
    " 73;

for "$\emptyset$" read --$\varphi$--.

UNITED STATES PATENT OFFICE
CERTIFICATE OF CORRECTION

Patent No. 3,515,979     Dated June 2, 1970

Inventor(s)     Marcel J. E. Golay

It is certified that error appears in the above-identified patent and that said Letters Patent are hereby corrected as shown below:

Column 5, line 29, for "$i_\phi$" read --$i_\varphi$--.

Column 3, line 42, for "H grad $\mu$= 0" read --H = grad u--.

Column 3, line 51, in equation (6);

for "$\alpha_{jk} x_j y^k z_\ell$" read --$a_{jk\ell} x^j y^k z^\ell$--.

Column 4, line 24;

for "orders" read --degrees--.

Column 4, line 36;

for "solution" read --solutions--.

Column 4, line 40;

for "u" read --$\mu$-- (both occurrences).

Column 4, line 42;

for "$\underline{u}$; and $\underline{u}_e$" read --$u_i$ and $u_e$--.

Column 4, line 46;

for "r-n-1" read --$r^{-n-1}$--.

Column 4, line 50;

for "z=axis" read --z-axis--.

PO-1050
(5/69)

UNITED STATES PATENT OFFICE
CERTIFICATE OF CORRECTION

Patent No. 3,515,979      Dated June 2, 1970

Inventor(s) Marcel J. E. Golay

It is certified that error appears in the above-identified patent and that said Letters Patent are hereby corrected as shown below:

Column 4, line 56;

for "$i_\delta$" read --$i_\varphi$--.

Column 4, lines 53 and 56;

for "3" read --$\theta$--.

Column 4, line 65;

for "$i_\varphi = \sin \delta$" read --$i_\varphi = r \sin \delta$--.

Column 5, line 67;

for "$<$" read --$>$--.

Column 6, line 42;

for "$|\vec{ds P}|^3$" in the denominator on the right-hand side of equation (18) read --$|\vec{dsP}|^3$--.

Column 6, line 74;

for "210°" (second occurrence) read --270°--.

Column 7, line 3;

for "sectional" read --sectorial--.

Column 6, line 32,
Column 7, line 4;

for "order" read --degree--.

UNITED STATES PATENT OFFICE
CERTIFICATE OF CORRECTION

Patent No. 3,515,979  Dated June 2, 1970

Inventor(s) Marcel J. E. Golay

It is certified that error appears in the above-identified patent and that said Letters Patent are hereby corrected as shown below:

Column 7, line 66;

for "$\triangle^2$" read --$\nabla^2$--.

Column 7, line 70;

for "with" read --which--.

Column 8, line 27;

for "Jn" read --$J_m$--.

Column 8, line 40;

for "$\left(\frac{r}{r_o}\right)_9$" at the end of the line read --$\left(\frac{r}{r_o}\right)^6$--.

Column 8, line 45;

for "$(2z^r - r^2) + \frac{1}{192} r_o^4$" read --$(2z^2 - r^2) + \frac{1}{192 r_o^4}$--.

Column 8, line 55;

for "$1 \frac{1}{2^2}$" read --$1 - \frac{1}{2^2}$--.

Column 8, line 57;

for "$\left(\frac{r}{r_o}\right)$" read --$\left(\frac{r}{r_o}\right)^6$--.

UNITED STATES PATENT OFFICE
CERTIFICATE OF CORRECTION

Patent No. 3,515,979           Dated June 2, 1970

Inventor(s) Marcel J. E. Golay

It is certified that error appears in the above-identified patent and that said Letters Patent are hereby corrected as shown below:

Column 8, line 60;

for "$\frac{1}{12} (2z^3 - 3zr^2) + \frac{1}{960} r_o^5$" read -- $\frac{1}{12r_o^3} (2z^3 - 3zr^2) + \frac{1}{960r_o^5}$ --.

Column 8, line 73, for "$122r^3$" read --$12z^2 r^3$--.

Column 9, line 5;

for "$\frac{1}{482r_o^4}$" read -- $\frac{1}{48r_o^4}$ --.

Column 9, line 5;

for "x1 + ...]" read -- $\left[\frac{z}{r_o} + \frac{1}{3!} \left(\frac{z}{r_o}\right)^3 + \frac{1}{5!} \left(\frac{z}{r_o}\right)^5 + ...\right]$ --.

Column 9, line 17;

for "$\sin \varphi$" read --$\sin 2\varphi$--.

Column 9, line 26;

for "$\frac{1}{\emptyset 6r_o^4}$" read -- $\frac{1}{96r_o^4}$ --.

Column 10, line 6;

for "$\left(\frac{r}{r_3}\right)$" read --$\left(\frac{r}{r_3}\right)$--.

UNITED STATES PATENT OFFICE
CERTIFICATE OF CORRECTION

Patent No. 3,515,979　　　Dated June 2, 1970

Inventor(s) Marcel J. E. Golay

It is certified that error appears in the above-identified patent and that said Letters Patent are hereby corrected as shown below:

Column 10, line 9, delete "contains" (second occurrence); line 10, for "and" read --and contains--.

Column 10, line 61;

for "By" read --$B_y$--; for "iy" read --$i_y$--.

Column 10, line 65;

for "$\frac{\partial i_x}{\partial x} + \frac{\partial i y}{\partial y} = 0$" read --$\frac{\partial i_x}{\partial x} + \frac{\partial i_y}{\partial y} = 0$--.

Column 11, line 52;

rewrite equation (38) as follows:
　--$i_x^2 + i_y^2 = i_c^2 = \left[\frac{\partial J_o\left(\frac{r}{r_1}\right)}{\partial r} \cosh \frac{z_m}{r_1}\right]^2$--.

Column 11, lines 61 and 62;

for "$r_o$" read --$r_1$-- (all three occurrences).

Column 11, lines 65 and 66;

for "$i y^2$) $d_x d_y$" read --$i_y^2$) $dxdy$--; for "$i_\phi^2$" read --$i_e^2$--;

for "$t_n$" read --$z_m$--; for $r_o$" (both occurrences) read --$r_1$-- for "$\mu$" (both occurrences) read --n--.

Column 12, line 3;

for "becomes" read --and the other two similar terms become-

UNITED STATES PATENT OFFICE
CERTIFICATE OF CORRECTION

Patent No. 3,515,979    Dated June 2, 1970

Inventor(s) Marcel J. E. Golay

It is certified that error appears in the above-identified patent and that said Letters Patent are hereby corrected as shown below:

Column 12, line 5;

add the following at the right-hand end of the expression (41):   $-- + r_3^{12} (r_1^2 - r_2^2)^2 \cosh^2 \frac{z_m}{r_3} --$.

Column 12, line 25;

for "n = m" read --m = o--.

Column 12, line 35;

insert a comma (,) between "$\frac{z}{r_o}$" and "$z < z_m$".

Column 12, line 46;

insert a comma (,) between "$\frac{z - z_m}{r_o}$" and "$z > z_m - z_1$".

Column 13, line 28; delete "of".

Column 13, line 50;

for "$(r_1^4 \; r_2^4)$" read --$(r_1^4 - r_2^4)$--; for "$\left(\frac{r}{r3}\right)$" read --$\left(\frac{r}{r_3}\right)$--.

Column 13, line 60;

for "$r_3^1 (r_1^4 - r_2^4) \Big]_2$" read --$r_3^2 (r_1^4 - r_2^4) \Big]^2$--.

Column 13, line 73;

for "$r_{36}$" read --$r_3^6$--.

- 12 -

UNITED STATES PATENT OFFICE
CERTIFICATE OF CORRECTION

Patent No. 3,515,979          Dated June 2, 1970

Inventor(s)          Marcel J. E. Golay

It is certified that error appears in the above-identified patent and that said Letters Patent are hereby corrected as shown below:

Column 14, line 3;

for "$(r_2^2 - r_3^2)$" read --$(r_2^2 - r_3^2)^2$--.

Column 14, line 12;

for "N" read --u--.

Column 14, line 33;

for "$(\ _3^4$" read --$(r_3^4$--.

Column 14, lines 41 to 43;

for "$\frac{zm}{r_1}$" read --$\frac{z_m}{r_1}$--; for "$\frac{zm}{r_2}$" read --$\frac{z_m}{r_2}$--; for "$\frac{zm}{r_3}$" read --$\frac{z_m}{r_3}$--.

Column 14, line 64;
Column 15, line 3;

for "$\frac{zm}{r_1}$" read --$\frac{z_m}{r_1}$--; for "$\frac{zm}{r_2}$" read --$\frac{z_m}{r_2}$--.

Column 14, line 45;

for "$(2_1^4 - r_2)$" read --$(r_1^4 - r_2^4)$--.

Signed and sealed this 28th day of December 1971.

(SEAL)
Attest:

EDWARD M. FLETCHER, JR.          ROBERT GOTTSCHALK
Attesting Officer                Acting Commissioner of Patents

Disclaimer

3,515,979.—*Marcel J. E. Golay*, Rumson, N. J. MAGNETIC FIELD CONTROL APPARATUS. Patent dated June 2, 1970. Disclaimer filed June 9, 1972, by the assignee, *The Perkin-Elmer Corporation.*
Hereby enters this disclaimer to claims 1, 2 and 5 of said patent.
[*Official Gazette April 22, 1975.*]